United States Patent
Sakai et al.

(10) Patent No.: US 7,548,289 B2
(45) Date of Patent: Jun. 16, 2009

(54) LCD DEVICE WITH FILM MEMBER ATTACHED TO POLARIZING ELEMENT AND SATISFIES A PREDETERMINED CONTAST RATIO TO BE EQUAL OR GREATER THAN 0.025 FOR ALL AZIMUTH ANGELS

(75) Inventors: Akira Sakai, Kyoto (JP); Masahiro Hasegawa, Nara (JP); Tokihiko Shinomiya, Nara (JP); Yuichiro Yamada, Mie (JP)

(73) Assignee: Future Vision Inc., Tokyo (JP)

( * ) Notice: Subject to any disclaimer, the term of this patent is extended or adjusted under 35 U.S.C. 154(b) by 340 days.

(21) Appl. No.: 11/333,648

(22) Filed: Jan. 18, 2006

(65) Prior Publication Data

US 2006/0158593 A1     Jul. 20, 2006

(30) Foreign Application Priority Data

Jan. 19, 2005    (JP)    ............................. 2005-012031

(51) Int. Cl.
    *G02F 1/1335*    (2006.01)
(52) U.S. Cl. ........................................ 349/96; 349/122
(58) Field of Classification Search ................... 349/96, 349/122
    See application file for complete search history.

(56) References Cited

U.S. PATENT DOCUMENTS 6,417,904 B1 * 7/2002 Yamaoka et al. ............ 349/117
6,731,357 B1 * 5/2004 Tachibana et al. ............. 349/96
2002/0140890 A1 * 10/2002 Hanada et al. ............... 349/122
2003/0021025 A1    1/2003 Saiki et al.
2004/0239852 A1   12/2004 Ono et al.
2005/0001956 A1 * 1/2005 Sugino et al. ................. 349/96

FOREIGN PATENT DOCUMENTS

| JP | 6-51117 | 2/1994 |
|---|---|---|
| JP | 6-160878 | 6/1994 |
| JP | 8-43812 | 2/1996 |
| JP | 8-240714 | 9/1996 |
| JP | 10-153802 | 6/1998 |
| JP | 11-223728 | 8/1999 |
| JP | 11-258605 | 9/1999 |
| JP | 11-305217 | 11/1999 |
| JP | 2000-131693 | 5/2000 |

(Continued)

*Primary Examiner*—David Nelms
*Assistant Examiner*—John Heyman
(74) *Attorney, Agent, or Firm*—Nixon & Vanderhye P.C.

(57) ABSTRACT

The liquid crystal display device according to the present invention comprising: a liquid crystal display cell including liquid crystal between two substrates facing to each other; a polarizing element provided on each side of the liquid crystal display cell; and at least one film member provided in at least either one area of areas between the liquid crystal display cell and the polarizing element, the polarizing element being formed from a film made of polyvinylalcohol resin, the film member being attached to the polarizing element with a cohesive layer and/or an adhesive layer having a thickness of less than 10 μm therebetween, and the film member provided in at least either one area of areas between the liquid crystal display cell and the polarizing element having an absolute value of a photoelastic coefficient of less than $10 \times 10^{-8}$ cm$^2$/N and having a water absorption of less than 2.0%.

28 Claims, 10 Drawing Sheets

FOREIGN PATENT DOCUMENTS

| | | |
|---|---|---|
| JP | 2001-235625 | 8/2001 |
| JP | 2002-174729 | 6/2002 |
| JP | 2002-196132 | 7/2002 |
| JP | 2002-221619 | 8/2002 |
| JP | 2003-279744 | 10/2003 |
| JP | 2001-91744 | 4/2004 |
| JP | 2004-309717 | 11/2004 |
| KR | 2003-0009222 A | 1/2003 |
| KR | 10-2004-0038896 A | 5/2004 |

* cited by examiner

LCD DEVICE WITH FILM MEMBER ATTACHED TO POLARIZING ELEMENT AND SATISFIES A PREDETERMINED CONTAST RATIO TO BE EQUAL OR GREATER THAN 0.025 FOR ALL AZIMUTH ANGLES

REFERENCE TO RELATED APPLICATION

This Nonprovisional application claims priority under 35 U.S.C. § 119(a) on Patent Application No. 2005-12031 filed in Japan on Jan. 19, 2005, and the entire contents of which are hereby incorporated in the present application by reference.

BACKGROUND OF THE INVENTION

1. Field of the Invention

The present invention relates to a liquid crystal display device. More specifically, the present invention relates to a liquid crystal display device including a film member such as protective film for polarizing element and retardation film.

2. Description of the Related Art

Liquid crystal display devices are widely used as a display device in various information-processing equipment such as computer and TV. And particularly in a liquid crystal TV field, there is rapidly growing demand for such liquid crystal display devices recently. For such liquid crystal display devices, further more improved display quality and reduction in manufacturing costs are strongly demanded with expansion of the market.

Under the circumstances, a liquid crystal display device in so-called vertical alignment (VA) mode has been proposed as an effective technique for improvement of display quality (For example, Japanese Kokai Publication No. Hei-11-258605, Japanese Kokai Publication No. Hei-10-153802, and Japanese Kokai Publication No. 2000-131693). In the liquid crystal display device in VA mode, liquid crystals having negative dielectric anisotropy are vertically aligned between substrates facing to each other during non-voltage application. In the liquid crystal display device in VA mode, a liquid crystal display cell hardly exhibits birefringence and rotatory polarization in the front direction. Therefore, if two polarizing elements are disposed so as to be perpendicular to each other on each side of the liquid crystal display cell, substantially perfect black display can be provided under no application of voltage, which permits very high contrast ratio. However, the liquid crystal display cell exhibits birefringence in an oblique direction. Therefore, the cell apparently has retardation and the geometric correlation of the two polarizing elements becomes not perpendicular intersection apparently, which causes light leakage, leading to reduction in contrast ratio. Accordingly, expansion of viewing angle is mentioned as a technical subject for the liquid crystal display device in VA mode. On the other hand, known is a technique in which a retardation film is provided in the liquid crystal display device in VA mode in order to cancel the retardation of the liquid crystal display cell in an oblique direction or to maintain the orthogonality of the polarizing elements. For example, Japanese Kokai publication No. Hei-11-258605, Japanese Kokai publication No. Hei-10-153802, and Japanese Kokai publication No. 2000-131693 disclose that a polarizing element is disposed on each side of a liquid crystal display cell in VA mode, and at least one retardation film is disposed between the polarizing element and the liquid crystal display cell to expand viewing angle. And a liquid crystal display device in so-called IPS (in-plane switching) mode has been proposed as an effective technique for improvement of display quality (For example, referring to Japanese Kokai publication No. Hei-06-160878, and Japanese Kokai publication No. Hei-11-305217). The liquid crystal display device in IPS mode provides display by applying transverse electric field on a horizontally aligned liquid crystal display cell disposing liquid crystal between two substrates each having a parallel aligned surface and by rotating liquid crystal molecules in an in-plane almost parallel to the substrates. The liquid crystal display device in IPS mode has advantages in that liquid crystal display cell shows birefringence hardly changing in an oblique direction and whereby the viewing angle is wide, because the device provides display by changing an angle which the liquid crystal molecules form with the polarizing element, with maintaining the liquid crystal molecules almost parallel to the substrates consistently. However, also in the liquid crystal display device in IPS mode, two polarizing elements are disposed so as to be perpendicular to each other as in the liquid crystal display device in VA mode. Therefore, the geometric correlation of the two polarizing elements is not perpendicular intersection apparently, which causes light leakage, leading to reduction in contrast ratio. Therefore, it is considered that a retardation film is provided also in the liquid crystal display device in IPS mode in order to suppress the reduction in contrast ratio. For example, Japanese Kokai Publication No. Hei-11-305217 discloses a technique in which a retardation film having controlled retardations in the in-plane direction and the thickness direction is disposed between a polarizing element and a liquid crystal display cell.

As the polarizing element in these liquid crystal display devices in liquid crystal modes, generally used is a uniaxially oriented transparent polymer film such as polyvinylalcohol resin film in which a dichromatic substance such as iodine or dichromatic dye is absorbed and oriented. However, such a polarizing element still has room for improvement in mechanical strength, heat resistance and moisture resistance. Therefore, durability of the polarizing element is generally secured by adhering a transparent protective film to both sides or one side of the polarizing element with an adhesive layer and the like therebetwen. Accordingly, the retardation film as mentioned above is generally adhered to outside of the protective film adhered to the polarizing element with a cohesive layer therebetween.

As the protective film, triacetyl cellulose film (hereinafter also referred to as "TAC") is conventionally used widely. However, the TAC film has room for improvement in sufficient securing of moisture resistance of the polarizing element due to its high moisture permeability. Therefore, proposed is a technique in which a film such as a film made of norbornene resin more excellent in vapor impermeability than the TAC film is used as the protective film in order to further more improve durability of the polarizing element under high temperature and high humidity (For example, referring to Japanese Kokai publication No. 2004-309717, Japanese Kokai publication No. Hei-06-51117, Japanese Kokai publication No. 2002-196132, Japanese Kokai publication No. 2001-235625, Japanese Kokai publication No. 2002-221619, Japanese Kokai publication No. 2002-174729, and Japanese Kokai Publication No. Hei-11-223728). Furthermore, proposed is a technique in which a film and the like made of norbornene resin is used to give function as a retardation film for a protective film in order to reduce the number of constituting films or to improve display quality (For example, referring to Japanese Kokai Publication Hei-08-43812 and Japanese Kokai Publication Hei-08-240714). Also, a technique in which a water absorption or photoelastic coefficient of a retardation film is reduced in view of stability of birefringence (retardation) characteristics, is disclosed (For example, referring to Japanese Kokai Publication No. 2001-91744).

However, there is still room for improvement in durability of the polarizing element in order to furthermore improve display quality of a liquid crystal display device. If TAC film as a protective film is adhered to a polymerizing element formed form a polyvinylalcohol resin film, preferably used is a method in which the film is adhered to the polarizing element containing moisture and then the attached body is dried to remove the moisture, because the polyvinylalcohol resin is brittle in dry state. However, if a film having a low moisture permeability, such as a film made of norbornene resin, is used as the protective film, the moisture is difficult to dry and remove after the adhesion. Therefore, there has been room for improvement in this point.

SUMMARY OF THE INVENTION

The present invention has made in view of the above-mentioned state of the art, and has an object to provide a liquid crystal display device having a polarizing element with high durability, thereby having excellent durability of display quality.

The present inventors have made various investigations about liquid crystal display devices having at least one film member such as a retardation film at an area between a liquid crystal display cell and a polarizing element. Then, they have noted that there is room for improvement in durability of the polarizing element and therefore display quality can be further more improved. For example, a liquid crystal display device shown in FIG. 5 has a configuration, in which a cohesive layer (pressure sensitive adhesive layer) 42 having a thickness of approximately 20 µm, a retardation film 62 made of polycarbonate (hereinafter also referred to as "PC") and the like, the cohesive layer 42 having a thickness of approximately 20 µm, a protective film 61 made of TAC, an adhesive layer 41, and the protective film 61 made of TAC are stuck in this order on each side of a liquid crystal display cell 10. However, the cohesive layer 42, the retardation film 62 made of PC and the like, and the protective film 61 made of TAC each has low durability, such as heat resistance characteristics and moisture resistance characteristics, which might have an adverse effect on durability of the polarizing elements 21 and 22.

With the above problem, the present inventors have studied on the following: (1) the retardation films 62 made of PC and the like are replaced by the retardation films 35 made of norbornene resin and the like more excellent in durability, as shown in a liquid crystal display device in FIG. 6; (2) in addition to the above configuration (1), the protective films 61 made of TAC are replaced by the protective films 36 made of norbornene resin more excellent in durability, as shown in a liquid crystal display device in FIG. 7; and (3) in addition to the above configuration (2), function of a retardation film is also given for the protective films 35, 36 made of norboenene resin and the like to reduce one retardation film and one cohesive layer 42 on each side of a liquid crystal display cell 10, as shown in a liquid crystal display device in FIG. 8. And they have noted that if a film member in at least one area between the liquid crystal display cell and the polarizing element has an absolute value of a photoelastic coefficient of less than $10 \times 10^{-8}$ cm$^2$/N and having a water absorption of less than 2.0%, durability of the film member is sufficiently improved and whereby display quality in the liquid crystal display device is improved.

Furthermore, the present inventors have found that, in addition to the above configuration, reduction in moisture absorption of the adhesive layer or the cohesive layer between the polarizing element and the protective film allows for further more improvement in durability of the polarizing element. That is, they have found that a film member is attached to a polarizing element with a cohesive layer and/or an adhesive layer having a thickness of less than 10 µm therebetween, and when attached to another film member, the film member is attached to the another film member with a cohesive layer and/or an adhesive layer having a thickness of less than 10 m therebetween, and thereby a liquid crystal display device comprising the polarizing element of high durability and having good display characteristics can be provided. Thereby the above-mentioned problems have been solved, leading to completion of the present invention.

That is, the present invention provides a liquid crystal display device comprising: a liquid crystal display cell including liquid crystal between two substrates facing to each other; a polarizing element provided on each side of the liquid crystal display cell; and at least one film member provided in at least either one area of areas between the liquid crystal display cell and the polarizing element, the polarizing element being formed from a film made of polyvinylalcohol resin in which iodine or dichromatic dye is absorbed and oriented, the film member being attached to the polarizing element with a cohesive layer and/or an adhesive layer having a thickness of less than 10 µm therebetween, and when attached to another film member, the film member being attached to the another film member with a cohesive layer and/or an adhesive layer having a thickness of less than 10 µm therebetween, the film member provided in at least either one area of areas between the liquid crystal display cell and the polarizing element having an absolute value of a photoelastic coefficient of less than $10 \times 10^{-8}$ cm$^2$/N and having a water absorption of less than 2.0%.

The technique disclosed in the present invention can improve durability of the polarizing element formed from PVA resin film, and thereby the present invention can provide a liquid crystal display device excellent in durability of display quality.

BRIEF DESCRIPTION OF THE DRAWINGS

FIG. 4-2 is a plan view showing the stacking body used for the liquid crystal display device according to the present invention and consisting of the bezel 51 and the liquid crystal display cell 10 and the like, when viewed from the observation side.

EXPLANATION OF SYMBOLS AND NUMERALS

Figure 1A:
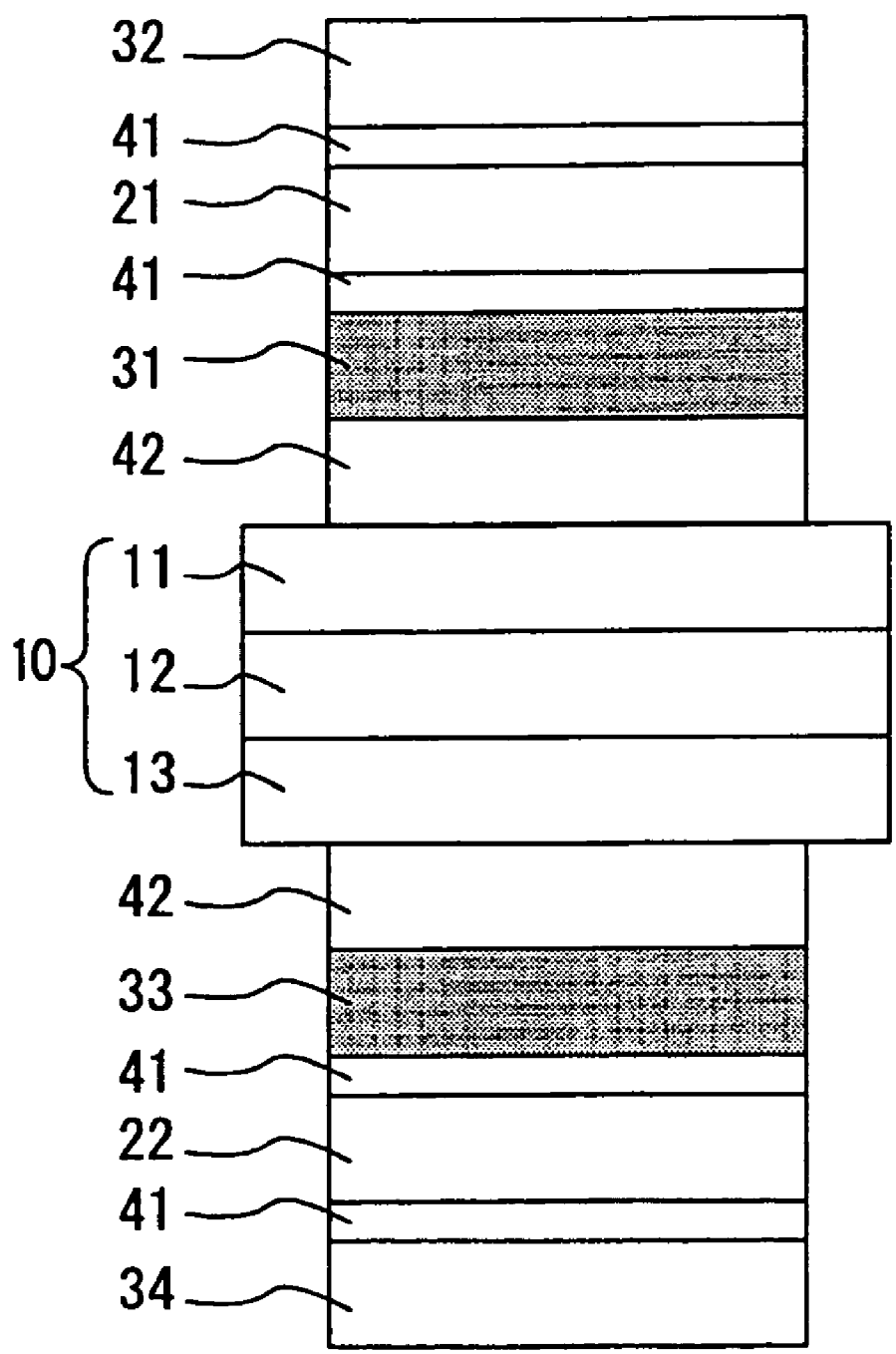
FIG. 1A is a cross-sectional view schematically showing an embodiment of the liquid crystal display device according to the present invention, the device having a configuration in which a protective film is disposed on each side of the polarizing element. A film having a low photoelastic coefficient and a low water absorption is used for a first and third protective film.

10: Liquid crystal display cell
11: Substrate on the observation side
12: Liquid crystal
13: Substrate on the rear side
21: Polarizing element (on the observation side)
22: Polarizing element (on the rear side)
31: First protective film having an absolute value of a photoelastic coefficient of less than $10 \times 10^{-8}$ cm$^2$/N and having a water absorption of less than 2.0%
31a: First protective film having an absolute value of a photoelastic coefficient of $10 \times 10^{-8}$ cm$^2$/N or more and having a water absorption of 2.0% or more
32: Second protective film
33: Third protective film having an absolute value of a photoelastic coefficient of less than $10 \times 10^{-8}$ cm$^2$/N and having a water absorption of less than 2.0%
33a: Third protective film having an absolute value of a photoelastic coefficient of $10 \times 10^{-8}$ cm$^2$/N or more and having a water absorption of 2.0% or more
34: Fourth protective film
35: Retardation film (NB film)
36: Protective film (NB film)
37: Film for retardation and protection (NB film)
41: Adhesive layer (0.5 µm in thickness)
42: Cohesive layer (pressure sensitive adhesive layer) (20 µm in thickness)
50: Display effective area of liquid crystal display device
51: Bezel
51a: Outer frame of bezel
51b: Inner frame of bezel
61: Protective Film (TAC film)
62: Retardation film (PC film)

DESCRIPTION OF THE PREFERRED EMBODIMENTS

In the present invention, a film member is attached to a polarizing element (polarizer) or another film member with a cohesive layer (pressure sensitive adhesive layer) and/or an adhesive layer having a thickness of less than 10 µm therebetween. If a staking body, which is prepared by stacking films made of different materials, such as different resins (herein, including a glass substrate constituting a liquid crystal display cell), and by adhering them to each other with the adhesive layer between each other, is subjected to a test for durability under high temperature and high humidity, defects such as foaming and interlaminar peeling easily occur. The defects are caused mainly because the films made of different materials expand and contract differently, or expand differently, and thereby the cohesive layer or the adhesive layer positioned between the films has distortion, and water gets into a gap generated due to the distortion. And if the cohesive layer or the adhesive layer adjacent to the polarizing element formed from a polyvinylalcohol resin film, in which iodine or dichromatic dye is absorbed and oriented, absorbs water due to the above reason, swelling, dissolution or the like of the polarizing element occurs, which easily causes defects such as decolorization of the polarizing element, and reduction of polarization degree. Therefore, preferably used is the cohesive layer or the adhesive layer which is preferably thin and hardly absorbs moisture under high temperature and high humidity. And if the adhesive layer has a thickness of less than 10 µm, durability of the polarizing element can be sufficient. The thickness of the cohesive layer and the adhesive layer is more preferably less than 2 µm.

The term "adhesion" means a state in which same type or different types of solid substances are integrated by attaching the surfaces to each other. The adhesive layer is generally a fluid liquid substance at the time of adhesion (attachment) and changes to solid substance by heat treatment or chemical reaction to exhibit adhesion force. On the other hand, the term "cohesion" means a state in which same type or different types of solid substances can be attached by application of slight pressure at normal temperature for short time and be integrated to the extent that one solid substance can be separated from another solid substance if the surface of the another solid substance is hard and smooth. The cohesive layer is generally a soft and jelly-like solid substance, and exhibits cohesion force without the above-mentioned change of the state as compared with the adhesive layer.

In the present invention, it is preferable that the film member is attached to the polarizing element or the another film member with the adhesive layer having a thickness of less than 10 µm therebetween. If the cohesive layer is too thin, cohesion force can be insufficiently exhibited. Therefore, the cohesive layer generally has a thickness of 20 to 50 µm enough to pass a test for durability needed for a liquid crystal display device. The cohesive layer having a thickness of less than 10 µm may fail to provide sufficient cohesion force for a general liquid crystal display device because of its low cohesion force. On the other hand, even an adhesion having a thickness of less than 10 µm can exhibit enough adhesion force for practical use. In the attachment of each member constituting a liquid crystal display device, it is preferred that no delamination is caused in many cases. From these viewpoints, the adhesive layer is more suitable for reduction of the thickness than the cohesive layer.

However, if the polarizing film, the retardation film or the like is attached to the liquid crystal display cell, not the adhesive layer but the cohesive layer is preferably used for the attachment for the purpose of separating only the film and reusing (also referred to as "reworking") the cell if failure in the attachment occurs. This is because the cell is generally several fold expensive than the film. Therefore, in the present invention, the cohesive layer having a thickness of 10 μm or more may be used for attachment to the liquid crystal display cell. However, for attachment to a member other than the liquid crystal display cell, used is/are the cohesive layer and/or adhesive layer having a thickness of less than 10 μm. Accordingly, one or less cohesive layer or adhesive layer having a thickness of 10 μm or more exists in areas between the substrate on the observation side in the liquid crystal display cell and the polarizing element on the observation side. And similarly, one or less cohesive layer or adhesive layer having a thickness of 10 μm or more exists in areas between the substrate on the rear side in the liquid crystal display cell and the polarizing element on the rear side.

In the liquid crystal display device, the film member provided in at least one area between the liquid crystal display cell and the polarizing element has an absolute value of a photoelastic coefficient of less than $10 \times 10^{-8}$ cm$^2$/N and having a water absorption of less than 2.0%. The film member having an absolute value of a photoelastic coefficient of less than $10 \times 10^{-8}$ cm$^2$/N can sufficiently suppress change in characteristics, such as in retardation, at high temperatures to provide a liquid crystal display device excellent in durability. As the absolute value of a photoelastic coefficient, a value determined with light at a wavelength of 550 nm at room temperature (approximately 23° C.) may be adopted. The absolute value of a photoelastic coefficient more preferably has an upper limit of $5 \times 10^{-8}$ cm$^2$/N. And the film member having a water absorption of less than 2.0% can sufficiently suppress moisture absorption at high humidity, change in characteristics such as retardation, and defects in the polarizing element to provide a liquid crystal display device excellent in durability. As the water absorption, adopted may be a rate of change in mass determined with a sample soaked with water at 23° C. for 24 hours according to JIS K 6911 "Testing methods for thermosetting plastics." The water absorption has more preferably an upper limit of 1.0%.

For example, a protective film and the like made of norbornene resin (hereinafter also referred to as "norbornene film") may be mentioned as the above-mentioned film member having an absolute value of a photoelastic coefficient of less than $10 \times 10^{-8}$ cm$^2$/N and having a water absorption of less than 2.0%. Such a norbornene film can serve as both the protective film and the retardation film. And retardation in the film is hardly influenced by heat or moisture, and thereby the film improves resistance to moisture and heat of display quality in the liquid crystal display device effectively.

Configuration of the liquid crystal display device according to the present invention is not especially limited as long as the device has the above-mentioned configuration essentially and configuration which a general liquid crystal display device has. For example, the present invention is not especially limited by drive system for liquid crystal, and can be applied to general liquid crystal display devices having constitution in which liquid crystal is disposed between a pair of substrates and providing display by voltage applied between electrodes formed in each of the substrates.

A preferable form of the liquid crystal display device according to the present invention will, hereinafter, be described in more detail.

It is preferable that the liquid crystal display device satisfies a relationship of CR (Φ, 60)/CR(0)≧0.025 at all azimuthal angles of Φ=0 to 360° when a contrast ratio of the liquid crystal display cell in a normal direction of the substrate on the observation side is defined as CR (0), a contrast ratio of the liquid crystal display cell in a direction inclined by 60° from the normal direction in an azimuthal angle Φ direction is defined as CR (Φ, 60). Such a liquid crystal display device can sufficiently satisfy viewing angle characteristic needed for liquid crystal display devices. As the liquid crystal display device satisfying the above-mentioned contrast ratio characteristic, mentioned may be a liquid crystal display device in which a retardation film is disposed in at least one area between a liquid crystal display cell in VA or IPS mode and at least either one of polarizing elements, for example. The value of [CR(Φ, 60)/CR(0)] more preferably has a lower limit of 0.040.

Figure 1B:
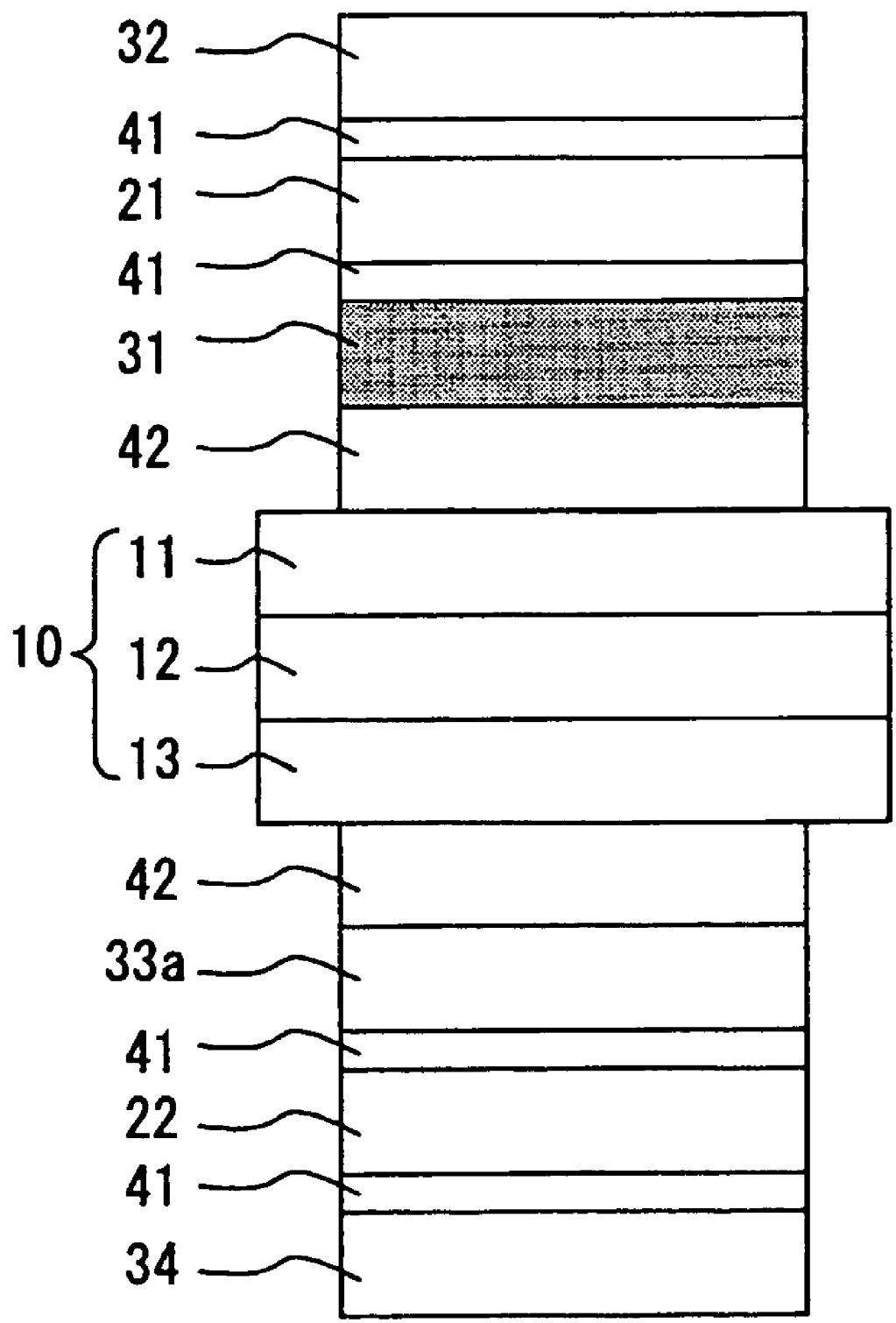
FIG. 1B is a cross-sectional view schematically showing an embodiment of the liquid crystal display device according to the present invention, the device having a configuration in which a protective film is disposed on each side of the polarizing element. A film having a low photoelastic coefficient and a low water absorption is used for a first protective film.
Figure 1C:
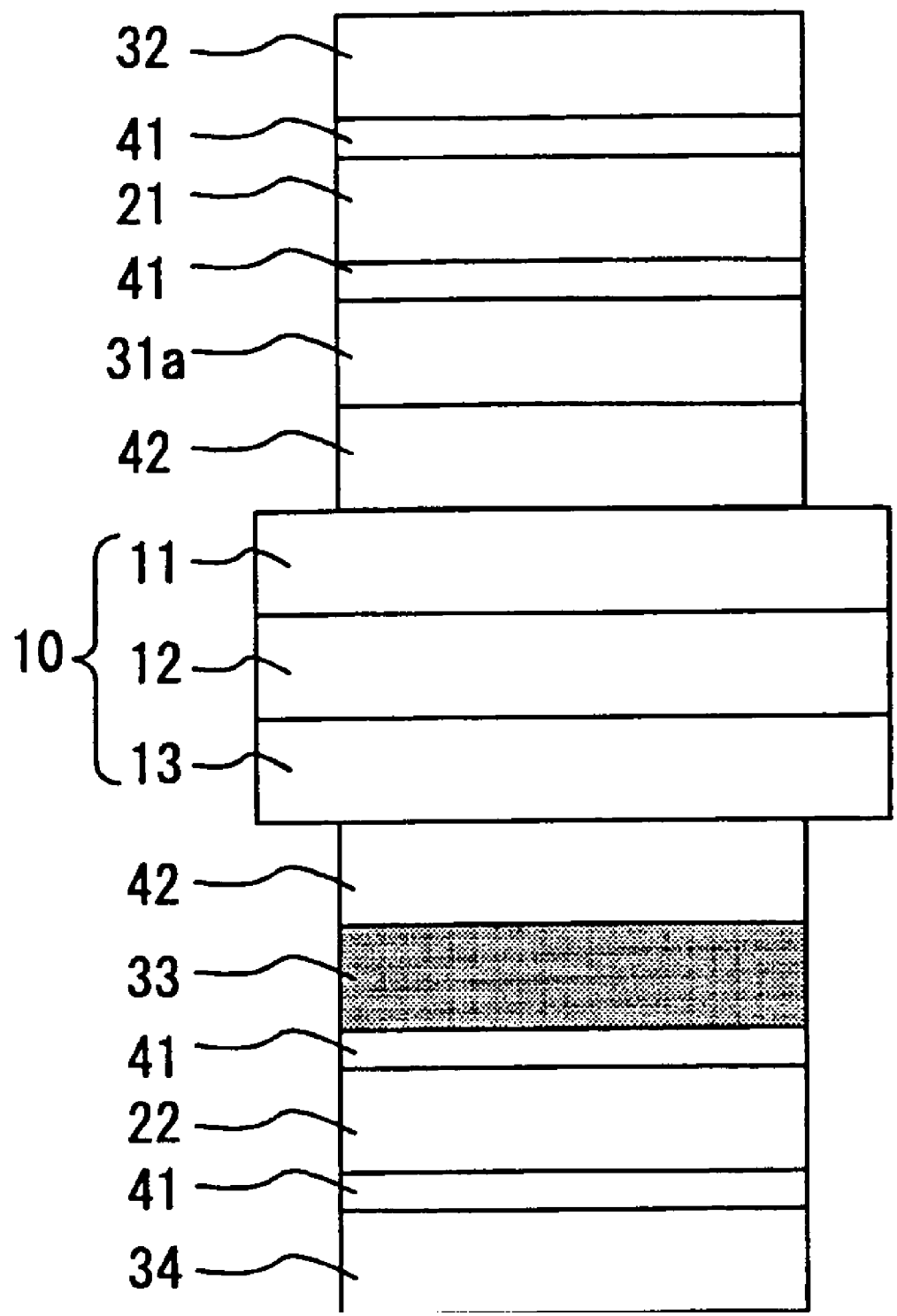
FIG. 1C is a cross-sectional view schematically showing an embodiment of the liquid crystal display device according to the present invention, the device having a configuration in which a protective film is disposed on each side of the polarizing element. A film having a low photoelastic coefficient and a low water absorption is used for a third protective film.

And in the present invention, it is preferable that fewer film members are disposed in the area between the liquid crystal display cell and the polarizing element for reduction in the thickness and manufacturing costs of the liquid crystal display device, in addition to improvement in durability of the polarizing element. Accordingly, it is preferable that the protective film for the polarizing element has function as a retardation film, and simultaneously has roles of protection of the polarizing element and cancel of retardation of the liquid crystal display cell in an oblique direction or maintenance of orthogonality of the polarizing elements. That is, it is preferable that the film member attached to the polarizing element is a protective film exhibiting birefringence. This enables the protective film for the polarizing element to serve also as a retardation film. Therefore, the liquid crystal display device can be thinner and manufactured at low cost, and reliability can be improved because the number of the cohesive layer easily absorbing moisture is reduced. And in this case, it is preferable that no other films exhibiting birefringence are disposed in at least either one area of areas between the liquid crystal display cell and the polarizing element. In the liquid crystal display device according to the present invention, a retardation in the thickness direction of the film member attached to the polarizing element is not especially limited, and is determined by considering all of a retardation value in the thickness direction of the liquid crystal display cell, arrangement and a retardation value in the thickness direction of the other film members and the like. And a retardation in the in-plane direction of the film member attached to the polarizing element is also determined by considering in view of the liquid crystal display device, similarly to the retardation in the thickness direction. It is particularly preferable that the film member having an absolute value of a photoelastic coefficient of less than $10 \times 10^{-8}$ cm$^2$/N and having a water absorption of less than 2.0% is provided on the rear side of the liquid crystal display cell. That is, it is preferable that only the film member having an absolute value of a photoelastic coefficient of less than $10 \times 10^{-8}$ cm$^2$/N and having a water absorption of less than 2.0% is provided at least in an area between the substrate on the rear side of the liquid crystal display cell and the polarizing element on the rear side. This is because the rear side of a liquid crystal display cell is subjected to high temperature environment because it is closer to a backlight than the observation side in transmissive and transflective (semitransmissive) liquid crystal display devices. Furthermore, if the film member having the above characteristics is provided in an area between the substrate on the observation side of the liquid crystal display cell and the polarizing element on the observation side, in addition to the area between the substrate on the rear side of the liquid crystal display cell and the polarizing element on the rear side, durability in display quality of the liquid crystal display device can be effectively improved because of no existence of films easily affected by heat and moisture. It is preferable that, in the liquid crystal display device, a first protective film is attached on the liquid crystal display cell side of the polarizing element on the observation side, a second protective film is attached on the observation side of the polarizing element on the observation side, a third protective film is attached on the liquid crystal display cell side of the polarizing element on the rear side, a fourth protective film is attached on the rear side of the polarizing element on the rear side, and each protective film is attached to the polarizing element with a cohesive layer and/or an adhesive layer having a thickness of less than 10 μm therebetween. Such a configuration can allow for effective improvement in durability of the polarizing elements on the observation side and the rear side. Examples of such a configuration include configurations shown in FIGS. 1A to 1C. The liquid crystal display device according to the present invention may have: a configuration in which the film member having an absolute value of a photoelastic coefficient of less than $10 \times 10^{-8}$ cm$^2$/N and having a water absorption of less than 2.0% is provided on each side of the liquid crystal display cell (FIG. 1A), as mentioned above; a configuration in which the film member is provided only on the observation side of the liquid crystal display cell (FIG. 1B); or a configuration in which the film member is provided only on the rear side of the liquid crystal display cell (FIG. 1C).

Furthermore, it is preferable that the first and third protective films each exhibits birefringence and serves also as a retardation film.

It is preferable that, in the liquid crystal display device, the protective films are made of different resins having different moisture permeabilities in a combination of the first and second protective films and/or in a combination of the third and fourth protective films. This configuration permits easy removal of internal moisture of the polarizing element even if a protective film made of resin having a low moisture permeability is attached to one side of the polarizing element. Therefore, adhesive strength and/or cohesive strength of the polarizing element and the protective film can be sufficiently secured while securing handling property of the polarizing element. The PVA constituting the polarizing element is brittle in dry state and thereby very difficult in handling. Therefore, the polarizing element is generally attached to the protective film, after containing much moisture. And a protective film made of resin having a low water absorption and a retardation hardly changed due to influence of moisture, such as norbornene resin, generally has a low moisture permeability. Therefore, if such a film having low moisture permeability is used as the protective film, moisture resistance of the polarizing element improves. However, if the protective films on both sides of the polarizing element each has too low moisture permeability, moisture contained at the attachment can be insufficiently removed to remain inside the polarizing element, which fails to provide sufficient adhesive strength and/or cohesive strength of the protective film and the polarizing element. With the above problem, in the above-mentioned configuration, a film made of a resin and the like other than norbornene resin is attached on one side of the polarizing element as the protective film such that the protective films on both side of the polarizing element have different moisture permeabilities. Therefore, moisture hardly remains inside the polarizing element. As the moisture permeability (vapor transmission rate), adopted may be a value determined with a sample kept standing for 24 hours at 40° C. and 90% humidity, according to JIS K 7129 "Testing methods for water vapor transmission rate of plastic film and sheeting." It is preferable that each difference in moisture permeability between the protective films in the above combinations is 200 g/m$^2$·24 hr or more. The protective film with a lower moisture permeability preferably has a moisture permeability of 100 g/m$^2$·24 hr or less. The protective film with a higher moisture permeability preferably has a moisture permeability of 300 g/m$^2$·24 hr or more.

The liquid crystal display device preferably satisfies at least one of the following formula (1) and (2).

[Formula 1]

Moisture permeability of the first protective film<Moisture permeability of the second protective film  (1);

[Formula 2]

Moisture permeability of the third protective film<Moisture permeability of the fourth protective film  (2)

Internal moisture of the polarizing element can be released outside after a stacking body having a structure of the protective film, the polarizing element and the protective film is attached to the liquid crystal display cell, because a moisture permeability of the first protective film is smaller than that of the second protective film, or a moisture permeability of the third protective film is smaller than that of the fourth protective film. Therefore, adhesive strength and/or cohesive strength of the polarizing element and the protective film can be sufficiently secured while securing handling property of the polarizing element.

It is preferable that the above-mentioned liquid crystal display cell provides black display under conditions where most liquid crystal molecules are substantially vertically aligned to the substrates and an in-plane retardation is substantially 0, in the liquid crystal display device, and when a corrected retardation R in the thickness direction is defined according to the following formula (3):

[Formula 3]

$$R=(1.3-0.6 \times na) \times Rxz+(0.7-0.3 \times na) \times Rxy \qquad (3)$$

in the formula, na representing an average refractive index of light at a wavelength of 550 nm, Rxy representing a retardation in the thickness direction of light at a wavelength of 550 nm, and Rxy representing a retardation in the in-plane direction, a corrected retardation R1 in the thickness direction of the first protective film, a corrected retardation R3 in the thickness direction of the third protective film, and a corrected retardation Rlc in the thickness direction of the liquid crystal display cell at black display satisfy a relationship shown by the following formula (4).

[Formula 4]

$$0 nm \leq R1+R3-Rlc \leq 35 \text{ nm} \qquad (4)$$

The above average refractive index na is defined by the following formula (5). The above retardation in the in-plane direction Rxy is defined by the following formula (6). The above retardation in the thickness direction Rxz is defined by the following formula (7).

[Formula 5]

$$na=(nx+ny+nz)/3 \qquad (5)$$

[Formula 6]

$$Rxy=(nx-ny) \times d \qquad (6)$$

[Formula 7]

$$Rxz=(nx-nz) \times d \qquad (7)$$

In the above formula (5) to (7), nx and ny each represents a principal refractive index (nx≧ny) in the in-plane direction of light at a wavelength of 550 nm, nz represents a principal refractive index in the thickness direction of light at a wavelength of 550 nm, and d represents a thickness.

The present invention can be appropriately applied to a normally black liquid crystal display device comprising a liquid crystal display cell in Vertical Alignment (VA) mode. And the liquid crystal display device satisfying the above formula (4) can provide sufficient viewing angle compensation in an oblique direction, and whereby provide excellent display quality at wide viewing angle. That is, the above formula (4) shows a design manual of retardation in VA mode. In the above formula (4), the corrected retardation R in the thickness direction defined according to the above formula (3) is adopted in order to make viewing angle compensation in VA mode more effective.

Hereinafter, a reason why the corrected retardation R in the thickness direction defined according to the above formula (3) is adopted in the above formula (4) will be described in more detail.

One of main purposes of visual angle compensation in VA mode is to cancel retardation of a liquid crystal display cell at black display, because the retardation is substantially 0 in the front direction, but not substantially 0 in an oblique direction. For this purpose, retardation of a retardation film needs to be appropriately designed. The retardation film has been designed by adjusting Rxy representing a retardation when viewed from right above, Rxz representing a retardation when (virtually) viewed from just beside, Rth=[(nx+ny)/2−nz]× d=Rxz−Rxy/2, or the like. Among them, a method, in which Rth of a liquid crystal display cell is equalized with sum of |Rth| of retardation films, has been particularly employed. However, in such a previous method, there is a significant error between the designed value and an effective designed value allowing retardation of the cell when viewed from an oblique direction to be actually canceled. This is because, for example, even the retardation films having the same Rth provide have different effective retardations in an oblique direction if the films are different in Rxy. Accordingly, use of the effective retardation R in an oblique direction is effective for design with high accuracy in the view of actual effect. In this case, preferable example of the oblique direction includes a direction satisfying both azimuthal angle=45° and elevation angle=60° (a direction inclined by 60° from the substrate surface normal direction). However, handling with Rxy, Rxz, and Rth data is practically standardized in panel manufacturers and retardation film industry. And these data are also described in a data sheet annexed to a retardation film on delivery. Therefore, the present inventors have studied on formula expediently estimating the effective retardation R from these data, and have found the above formula (3) from results of the study such as various experiments and calculations. However, the formula (3) also uses an average refractive index na derived from a resin forming a film, in addition to Rxy and Rxz. Accordingly, the present invention can provide practically enough viewing angle if effective retardations R for a retardation film and a liquid crystal display cell are determined by the above formula (3) and then sum of the effective retardations R satisfies the range shown in the formula (4).

It is preferable that at least either one protective film having a larger corrected retardation in the thickness direction of the first and third protective films has an absolute value of a photoelastic coefficient of less than $10 \times 10^{-8}$ cm$^2$/N. The protective film having an absolute value of a photoelastic coefficient of less than $10 \times 10^{-8}$ cm$^2$/N can sufficiently decrease change in characteristics such as in retardation under high temperature environment. However, if the first and third protective films have different corrected retardations in the thickness direction, change in characteristics under high temperature environment can be efficiently suppressed particularly by giving a smaller photoelastic coefficient for the protective film with a larger corrected retardation in the thickness direction. Thereby, durability of the liquid crystal display device can be particularly effectively improved.

It is preferable that at least either one protective film having a larger retardation in the thickness direction of the first and third protective films has an water absorption of less than 2.0%. The protective film having a water absorption of less than 2.0% can sufficiently decrease change in characteristics such as in retardation under high humidity environment. If the first and third protective films have different corrected retardations in the thickness direction, change in characteristics under high humidity environment can be particularly efficiently suppressed by giving a lower water absorption for the protective film having a larger corrected retardation in the thickness direction. Thereby, durability of the liquid crystal display device can be particularly effectively improved.

It is preferable that at least one protective film among the first to fourth protective films has a moisture permeability of 100 g/m$^2$·24 hr or less. This configuration permits reduction in amount of moisture permeating through the protective film under high humidity. Therefore, durability of the polarizing element and stability of retardation of the protective film, which can provide a liquid crystal display device excellent in durability of display quality. The moisture permeability more preferably has an upper limit of 80 g/m$^2$·24 hr. It is preferable that the protective film having a moisture permeability of 100 g/m$^2$·24 hr or less is disposed in at least either one area between the liquid crystal display cell and the polarizing element. That is, it is preferable that at least either one protective film of the first and third protective films has a moisture permeability of 100 g/m$^2$·24 hr or less. Because of this configuration, internal moisture of the polarizing element can be released outside even after a stacking body having a structure of the protective film, the polarizing element and the protective film is attached to the liquid crystal display cell. Therefore, adhesive strength and/or cohesive strength of the polarizing element and the protective film can be sufficiently secured while securing handling property of the polarizing element.

It is preferable that at least one protective film among the first to fourth protective films is made of norbornene resin. Such a protective film made of norbornene resin can serve as both the protective film and as the retardation film. And the protective film made of norbornene resin can suppress change in retardation caused by heat or moisture because the film has values suitable for the present invention in characteristics, such as photoelastic coefficient, water absorption and moisture permeability. Therefore, a liquid crystal display device excellent in resistance to moisture heat of display quality can be provided. The norborne resin means a resin mainly containing a polymer produced by polymerizing a norbornene, a derivative or a salt thereof.

Furthermore, the present inventors have found that if a liquid crystal display device is subjected to very hard tests for durability, a crack might occur gradually from ends of the polarizing element in the absorption axis direction. Therefore, the liquid crystal display device preferably has measures for preventing reduction in display quality caused by the crack generated in peripheral areas of the polarizing element. Specifically, the device preferably has: a configuration (1) in which a maximum breadth in the absorption axis direction of the polarizing element adjacent to the protective film is larger than a maximum breadth in the absorption axis direction of a display effective area of the liquid crystal display device; a configuration (2) in which the liquid crystal display device further comprises a bezel, and a maximum breadth in the absorption axis direction of the polarizing element adjacent to the protective film is larger than a maximum breadth in the absorption axis direction of an aperture region of the bezel; or a configuration (3) in which a peripheral edge crossing the absorption axis direction of the polarizing element adjacent to the protective film is coated with a sealing agent having hydrophobicity.

A configuration combining the configurations (1) to (3) is more preferable. The above configurations (1) to (3) are preferably applied to the polarizing element to which the protective film having a moisture permeability of $100 \text{ g/m}^2 \cdot 24 \text{ hr}$ or less is attached. This is because a protective film having a low moisture permeability needs to be attached to the polarizing element dried to some extent and because a crack easily occurs particularly in the polarizing element.

Figure 2:
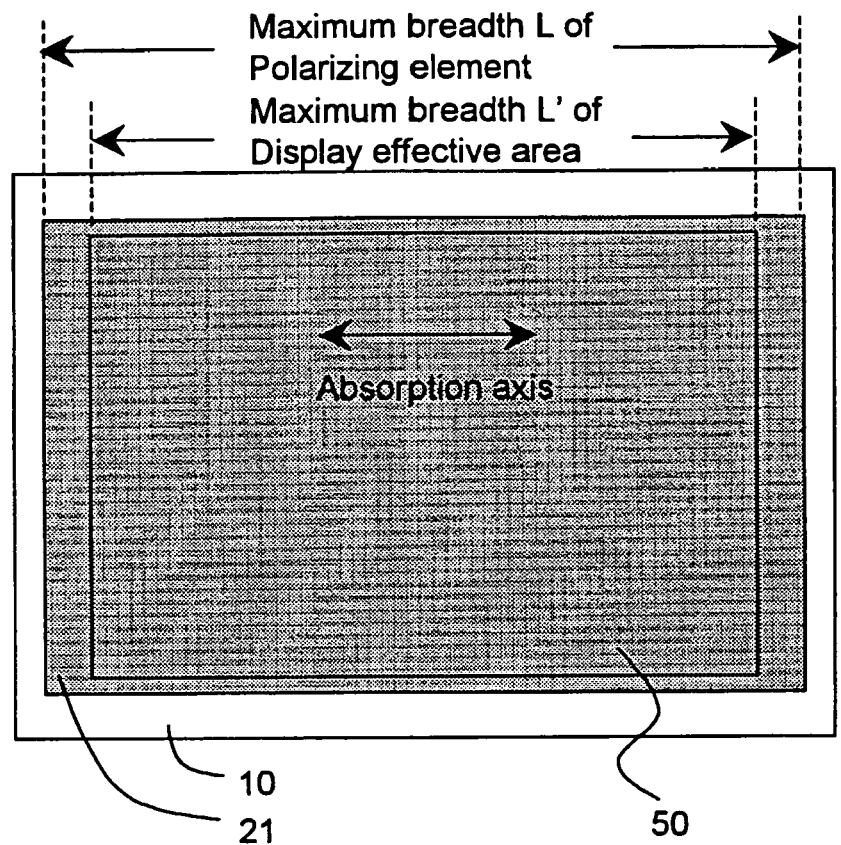
FIG. 2 is a plan view illustrating a preferable relationship of a maximum breadth L of a polarizing element 21 and a maximum breadth L' of a screen (a display effective area 50 of the liquid crystal display device) in the liquid crystal display device according to the present invention.

According to the above configuration (1), a maximum breadth L in the absorption axis direction of a polarizing element 21 adjacent to a protective film (not shown) is larger than a maximum breadth L' in the absorption axis direction of a screen (a display effective area 50 of a liquid crystal display device), as shown in FIG. 2. Such a configuration can prevent the crack generated in peripheral areas of the polarizing element from causing adverse effect on display quality of the liquid crystal display device. Furthermore, a liquid crystal display device and the like having a relatively large screen, such as a liquid crystal TV, preferably satisfies a relationship of L−L'≧4 mm, if a maximum breadth in the absorption axis direction of a polarizing element adjacent to a protective film (hereinafter also referred to as "maximum breadth in the absorption axis") is defined as L, and a maximum breadth in the absorption axis direction of a display effective area of the liquid crystal display device is defined as L'. In this case, it is preferable that the protective film has peripheral areas of 2 mm or more wider than the display effective area of the liquid crystal display device in the absorption axis direction on each side. It is more preferable that the liquid crystal display device satisfies a relationship of L−L'≧10 mm.

Figure 3:
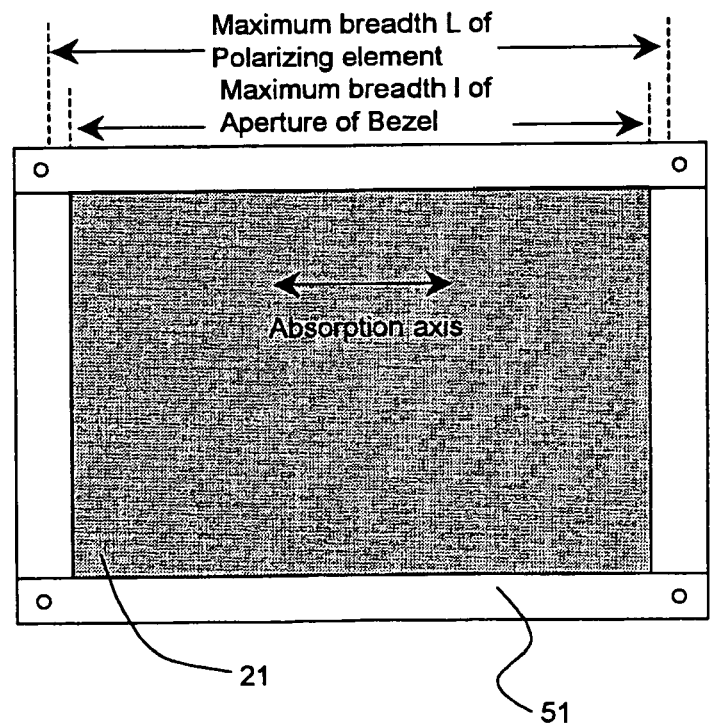
FIG. 3 is a plan view illustrating a preferable relationship of the maximum breadth L of a polarizing element 21 and a maximum breadth 1 of an aperture of a bezel 51 in the liquid crystal display device according to the present invention.

According to the above configuration (2), peripheral areas of the polarizing element 21 adjacent to the protective film (not shown) are covered with a bezel 51, as shown in FIG. 3. Such a configuration can prevent the crack generated in peripheral areas of the polarizing element from causing adverse effect on display quality of the liquid crystal display device. And a liquid crystal display device and the like having a relatively large screen, such as a liquid crystal TV, preferably satisfies a relationship of L−l≧4 mm, if a maximum breadth in the absorption axis direction is defined as L, and a maximum breadth in the absorption axis direction of an aperture area of the bezel is defined as l. In this case, the protective film has 2 mm or wider peripheral areas outside the aperture area of the bezel in the absorption axis direction on each side.

It is more preferable that the liquid crystal display device satisfies a relationship of L−l≧10 mm.

According to the above configuration (3), end faces of the polarizing element adjacent to a protective film are sealed. Such a configuration can prevent the crack from generating in the polarizing element, which can prevent reduction in display quality of the liquid crystal display device.

The present invention will, hereinafter, be described in more detail with reference to Embodiments, but the present invention is not limited to only Embodiments.

Firstly, a configuration of the liquid crystal display device according to the present Embodiment is explained.

Figures 1, 4:
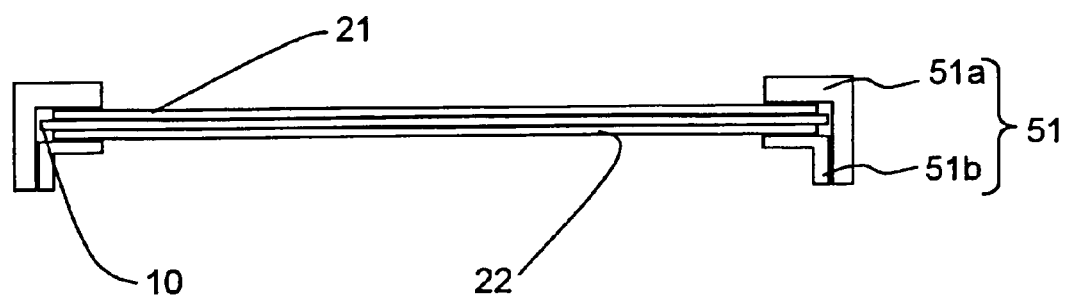
FIG. 4-1 is a cross-sectional view illustrating the liquid crystal display device according to the present invention in which a stacking body consisting of a liquid crystal display cell 10 and the like is supported and fixed with a bezel 51.
Figures 2, 4:
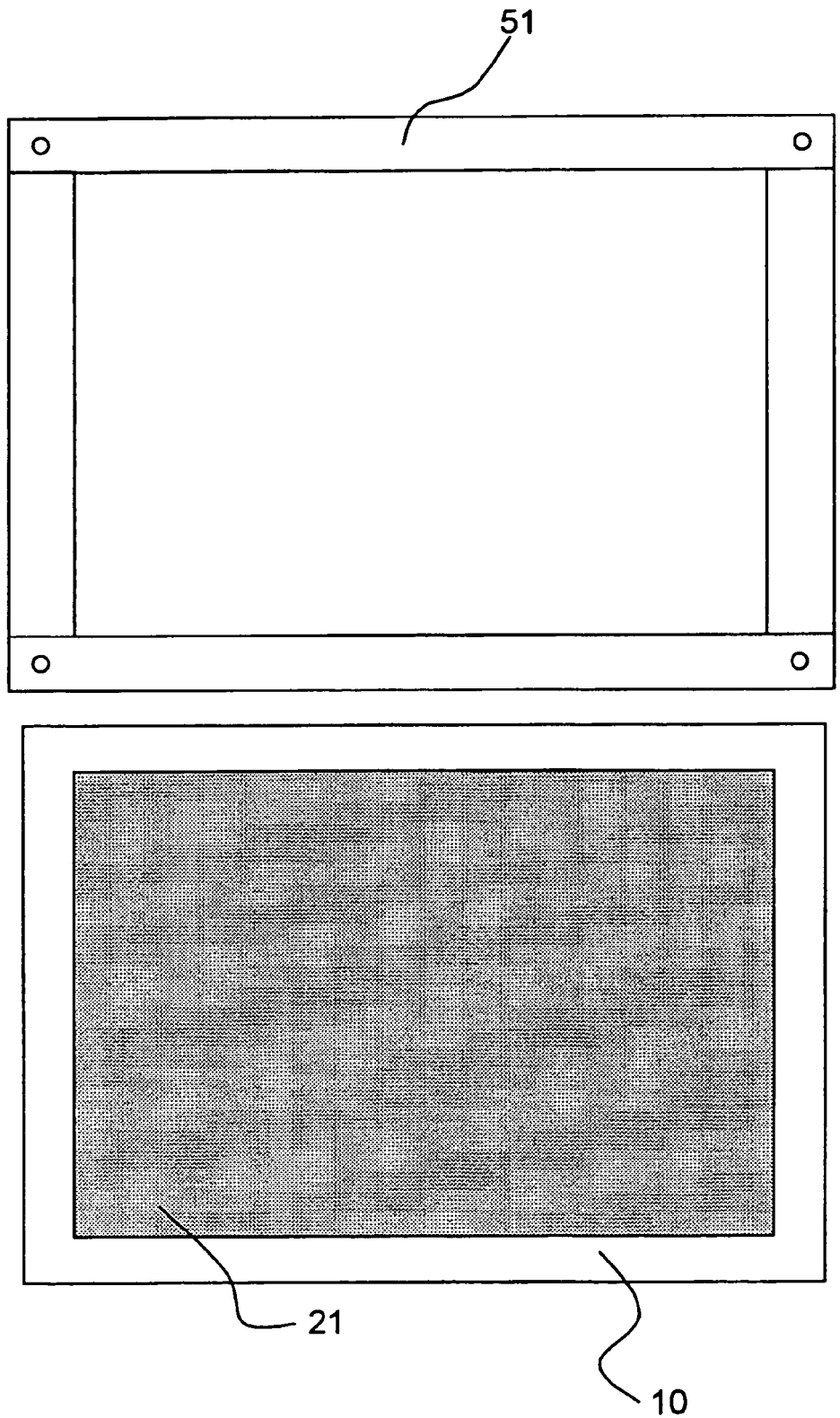
Figure 5:
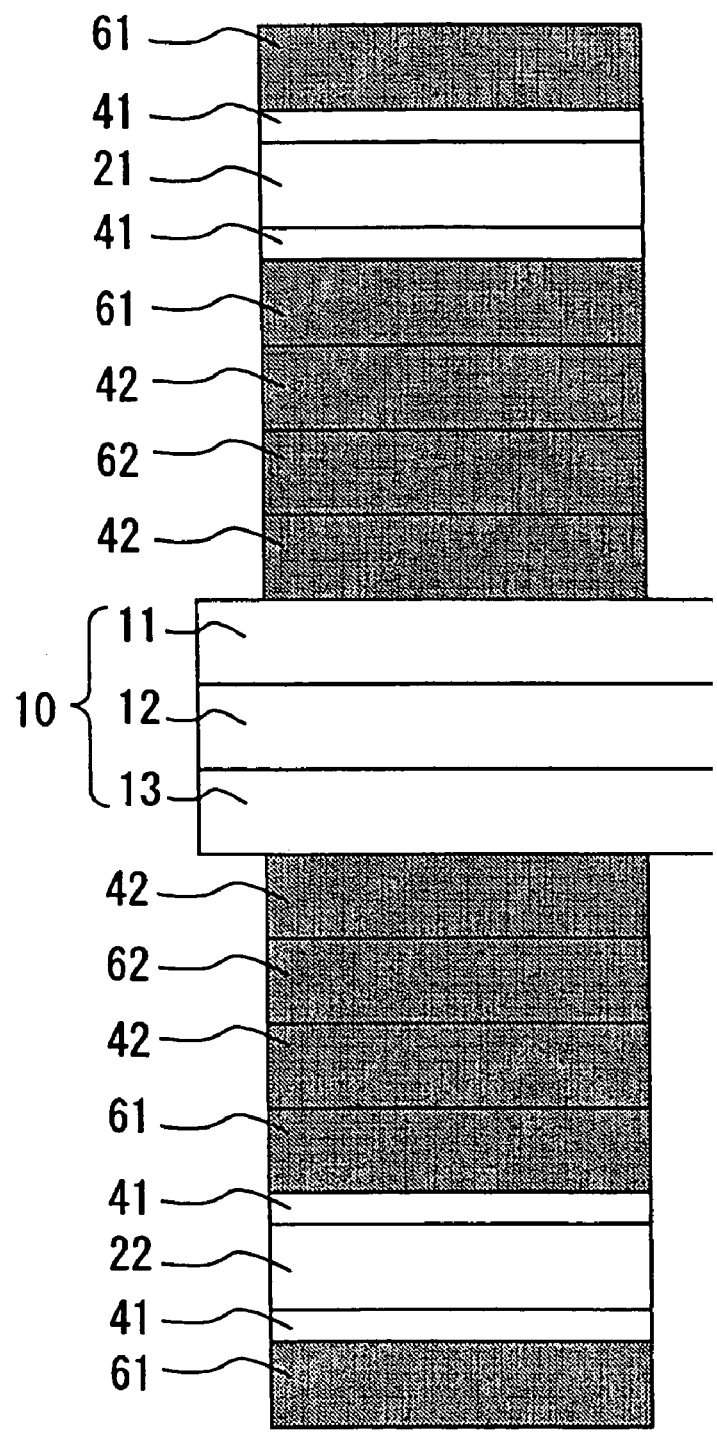
FIG. 5 is a cross-sectional view schematically showing an embodiment of configuration of a previous liquid crystal display device.
Figure 6:
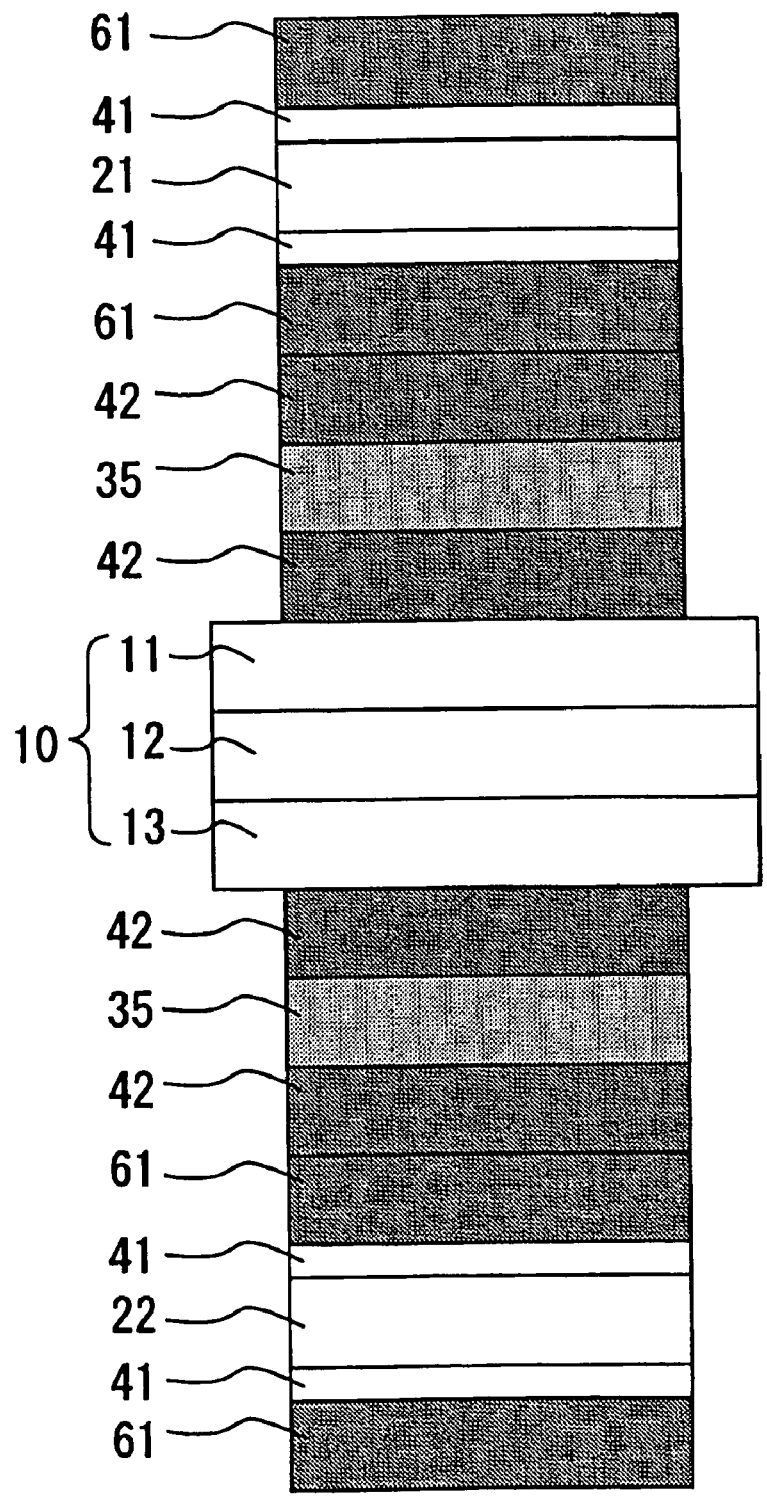
FIG. 6 is a cross-sectional view schematically showing a configuration in which a material for the retardation film in the liquid crystal display device shown in FIG. 5 is improved.
Figure 7:
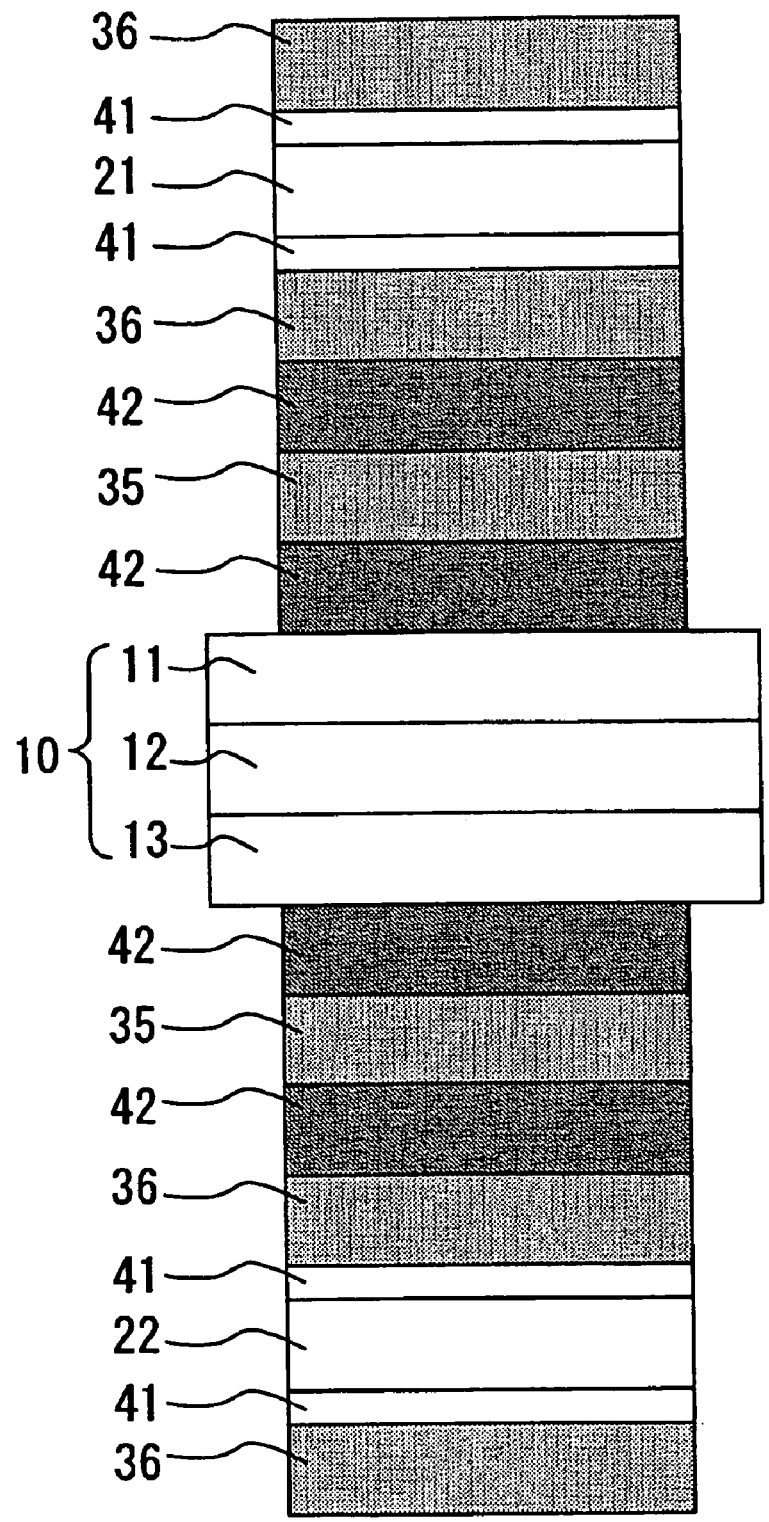
FIG. 7 is a cross-sectional view schematically showing a configuration in which a material for the protective film for the polarizing element in the liquid crystal display device shown in FIG. 6 is improved.
Figure 8:
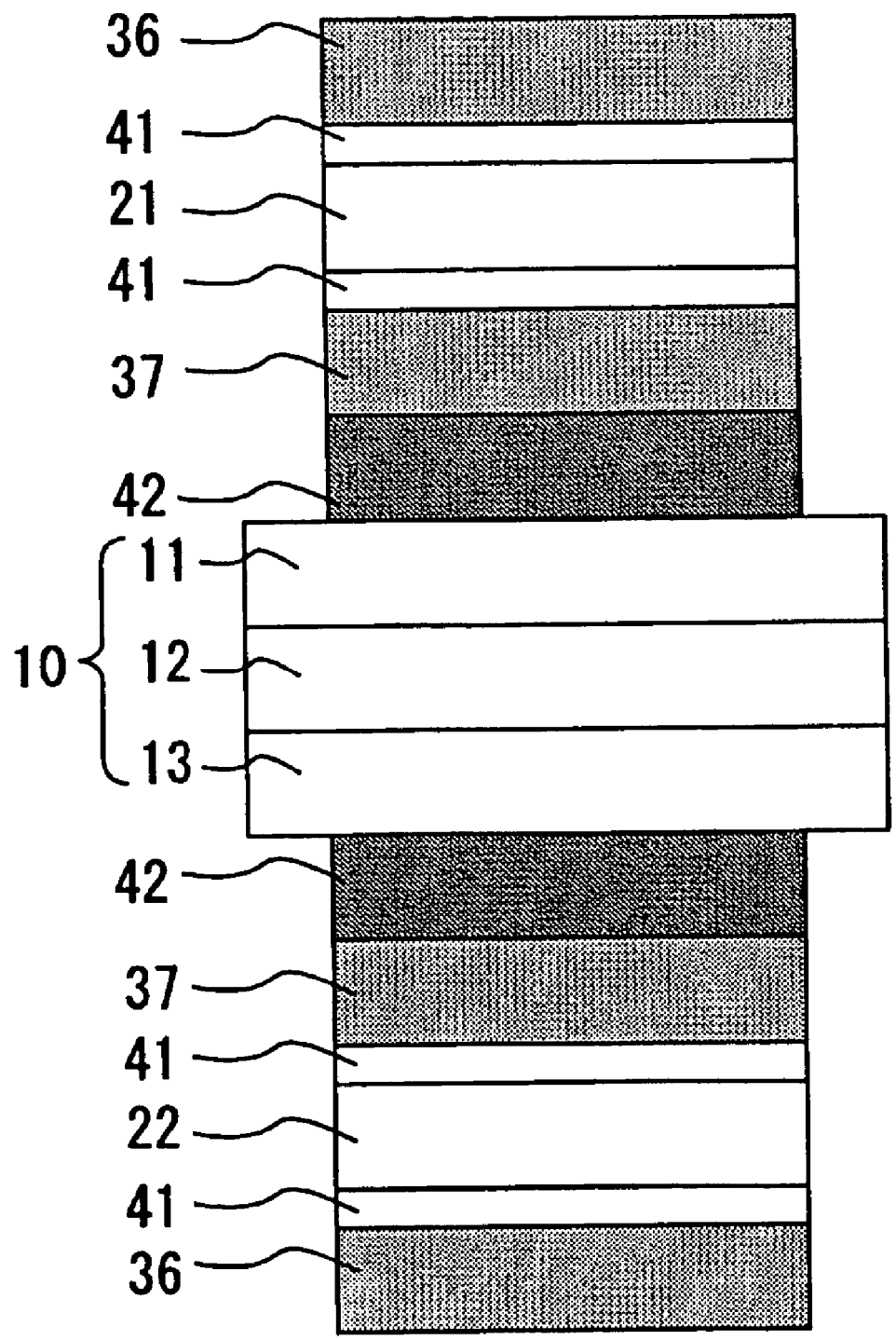
FIG. 8 is a cross-sectional view schematically showing a configuration in which the configuration of the liquid crystal display device shown in FIG. 7 is improved to integrate the protective film for the polarizing element and the retardation film.

The liquid crystal display device according to the present Embodiment, as schematically shown in FIG. 1, has an integrated base configuration in which a second protective film 32, a first polarizing element 21, a first protective film 31 or 31a, a liquid crystal display cell 10, a third protective film 33 or 33a, a second polarizing element 22 and a fourth protective film 34 are attached to each other subsequently from the observation side with a cohesive layer 42 or an adhesive layer 41 between each other and the attached body is sandwiched by a bezel having an aperture corresponding to an effective display area of the liquid crystal display device. The liquid crystal display cell 10 has a structure in which liquid crystal 12 is provided between a substrate on the observation side 11 and a substrate on the rear side 13 facing to each other.

Each component of the liquid crystal display device according to the present Embodiment will, hereinafter, be described.

(1-1) Film for Protection and Retardation

In the present Embodiment, films shown in Table 1 were used as the first to fourth protective films, respectively. In Table 1, "NB" shown in "resin" represents norbornene resin, "TAC" represents triacetyl cellulose resin, and "PC" represents polycarbonate resin. "Average refractive index na" is defined by the above formula (5). "Retardation in the in-plane direction Rxy" is defined by the above formula (6). "Retardation in the thickness direction Rxz" is defined by the above formula (7). "Corrected retardation in the thickness direction R" is defined by the above formula (3). "Moisture permeability" shows a value determined with a film having a thickness shown in Table 1. Some films shown in Table 1 were subjected to a stretching such as longitudinally uniaxial stretching, transversely uniaxial stretching, longitudinally and transversely simultaneous stretching, or longitudinally and transversely sequential stretching to adjust a retardation in the in-plane direction Rxy or a retardation in the thickness direction Rxz. And in some films, moisture permeability was adjusted using a relationship between a film thickness and a moisture permeability, in which the thicker a film thickness becomes, the lower a moisture permeability becomes, and the thinner a film thickness becomes, the higher a moisture permeability becomes.

TABLE 1

| Film | Resin | Average Refractive Index na | Thickness μm | Photoelastic Coefficient \| $10^{-8}$ cm$^2$/N \| | Water Absorption % (23° C. 24 hr) | Moisture Permeability g/m$^2$ · 24 hr (40° C. 90% RH) | Rxy nm | Rxz nm | R nm |
|---|---|---|---|---|---|---|---|---|---|
| N-1 | NB | 1.51 | 100 | 4 | 0.4 | 30 | 2 | 45 | 18 |
| N-2 | NB | 1.51 | 77 | 4 | 0.4 | 60 | 40 | 100 | 49 |
| N-3 | NB | 1.51 | 19 | 4 | 0.4 | 170 | 50 | 225 | 101 |

TABLE 1-continued

| Film | Resin | Average Refractive Index na | Thickness μm | Photoelastic Coefficient \| 10$^{-8}$ cm$^2$/N \| | Water Absorption % (23° C. 24 hr) | Moisture Permeability g/m$^2$ · 24 hr (40° C. 90% RH) | Rxy nm | Rxz nm | R nm |
|---|---|---|---|---|---|---|---|---|---|
| N-4 | NB | 1.51 | 21 | 4 | 0.4 | 160 | 55 | 145 | 71 |
| N-5 | NB | 1.51 | 71 | 4 | 0.4 | 60 | 60 | 120 | 62 |
| N-6 | NB | 1.51 | 86 | 4 | 0.4 | 40 | 60 | 285 | 127 |
| N-7 | NB | 1.51 | 63 | 4 | 0.4 | 70 | 65 | 155 | 77 |
| N-8 | NB | 1.51 | 106 | 4 | 0.4 | 30 | 65 | 230 | 107 |
| N-9 | NB | 1.51 | 91 | 4 | 0.4 | 40 | 70 | 220 | 104 |
| N-10 | NB | 1.53 | 101 | 3 | 0.01 | 1 | 3 | 40 | 16 |
| N-11 | NB | 1.53 | 77 | 3 | 0.01 | 2 | 50 | 195 | 87 |
| N-12 | NB | 1.53 | 73 | 3 | 0.01 | 3 | 60 | 120 | 60 |
| N-13 | NB | 1.53 | 73 | 3 | 0.01 | 3 | 60 | 210 | 95 |
| N-14 | NB | 1.53 | 66 | 3 | 0.01 | 3 | 60 | 255 | 112 |
| N-15 | NB | 1.53 | 70 | 3 | 0.01 | 3 | 65 | 230 | 104 |
| N-16 | NB | 1.53 | 70 | 3 | 0.01 | 3 | 70 | 145 | 72 |
| N-17 | NB | 1.53 | 52 | 3 | 0.01 | 5 | 70 | 295 | 130 |
| T-1 | TAC | 1.49 | 80 | 6 | 5.1 | 460 | 3 | 55 | 23 |
| T-2 | TAC | 1.49 | 75 | 6 | 5.1 | 480 | 65 | 230 | 110 |
| T-3 | TAC | 1.49 | 68 | 6 | 5.1 | 520 | 65 | 250 | 118 |
| P-1 | PC | 1.59 | 41 | 92 | 0.4 | 50 | 70 | 245 | 100 |

In the present invention, material of the film member such as protective film is not especially limited, and transparent film resins having a low water absorption (or moisture permeability) and a low photoelastic coefficient are preferably used. In addition, water absorption and moisture permeability are closely related. A relationship, in which the higher a water absorption is, the higher a moisture permeability is, is often established. As transparent film resins satisfying the above characteristic, an amorphous polyolefin resin may be mentioned. The amorphous polyolefin resin has cycloolefin, such as norbornene and polycyclic norbornene monomer, as a polymer unit. Among them, a (thermoplastic saturated) norbornene resin is particularly widely known, and commercially available are trade name "ARTON" which is product of JSR Corp., trade name "ZEONEX" and "ZEONOR" which are products of ZEON Corp., trade name "APEL" which is product of Mitsui Chemical, Inc., and the like. These resins each can be formed into a film by solvent-cast method, melt extrusion method and the like. The norbornene resin (hereinafter also referred to as "NB") is used as material for films N-1 to N-17 in the present Embodiment.

Transparent film resins having a low photoelastic coefficient and a high water absorption (or moisture permeability) may be used as material for the film members such as the protective film in the present invention. As transparent film resins satisfying the above characteristic, a triacetyl cellulose resin (TAC) may be mentioned. The TAC has been most widely used as a general protective film for polarizing elements. The TAC is used as material for films T-1 to T-3 in the present Embodiment.

Transparent film resins having a low water absorption (or moisture permeability) and a high photoelastic coefficient may be used as material for the film members such as the protective film in the present invention. As transparent film resins satisfying the above characteristic, for example, a polycarbonate resin (PC) may be mentioned. The PC is used as material for a film P-1 in the present Embodiment.

The TAC and the PC each can be formed into a film by solvent-cast method, melt extrusion method and the like.

(1-2) Polarizing Element

A PVA resin film, in which iodine or dichromatic dye was absorbed and oriented, was used as the polarizing element in the present Embodiment. The PVA polarizing element was prepared by soaking a PVA film stretched by 5 times with a solution containing iodine and potassium iodine for dyeing, and by subjecting the film to a cross-linking treatment in a solution consisting of boric acid and potassium iodide. For attachment of the polarizing element and each protective film, used was a method in which the polarizing element is soaked with water and then the protective film is stuck on the polarizing element with adhesive layer containing water as a main solvent therebetween.

(1-3) Cohesive Agent and Adhesive Agent

An acrylic cohesive agent was used as the cohesive agent (cohesive layer) in the present Embodiment. The acrylic cohesive layer had a thickness of 20 μm. And a PVA adhesive agent or a urethane adhesive agent was used as the adhesive agent (adhesive layer). The adhesive layer had a thickness of 1 μm or less.

(1-4) Liquid Crystal Display Cell

In the present Embodiment, used was a liquid crystal display cell in Multidomain Vertical Alignment (MVA) mode, which provides white display by dividing one pixel area into four areas and by aligning liquid crystal molecules substantially horizontally in each area, among liquid crystal display cells providing black display under conditions where most liquid crystal molecules are substantially vertically aligned to substrates and an in-plane retardation is substantially 0. The retardation in the thickness direction Rlc of the liquid crystal display cell was set to any of 260 nm, 290 nm and 320 nm at black display. The retardation in the in-plane direction Rxy of the liquid crystal display cell was set to substantially 0 nm at black display. The liquid crystal display cell has a refractive index na of 1.50 and a diagonal line length of 30 inches. A glass substrate was used as the substrates.

(1-5) Bezel

A bezel 51 is a member (case) for supporting and fixing the liquid crystal display cell 10, the polarizing elements 21 and 22, the film members (not shown) and the like inside a liquid crystal display device, as shown in FIG. 4-1. In the present Embodiment, used is a metal bezel 51 having a square aperture for exposing a display area of the liquid crystal display device. The bezel 51 has a front part serving as a frame covering peripheral edges of the liquid crystal display cell 10, and a side part positioning around the front and being turned at right angle to the front towards the rear, and has a L-like cross-section. Accordingly, the square aperture was provided on the front part. The bezel 51 consists of an outer frame 51a and an inner frame 51b. The liquid crystal display cell 10 was sandwiched, supported and fixed between the outer frame 51*a* and the inner frame 51*b*. The bezel 51 was formed by press molding.

(1-6) Sealing Agent

In liquid crystal display devices according to some Examples in the present Embodiment, a peripheral edge crossing the absorbing axis direction of the polarizing element, among peripheral edges of the polarizing element, was coated with a sealing agent. A fluorine hydrophobic material was used as the sealing agent and applied with a brush.

Examples each illustrating a liquid crystal display device produced by changing a component in the liquid crystal display device according to the present Embodiment will, hereinafter, be described.

Tables 2 and 3 show each configuration of liquid crystal display devices in Examples. In Table, the acrylic cohesive agent layer having a thickness of 20 μm is abbreviated as "A-cohesive-20", the PVA adhesive agent layer having a thickness of 1 μm thickness as "P-adhesive-1", and the urethane adhesive agent layer having a thickness of 1 μm as "U-adhesive-1."

TABLE 2

| | | | Ex. 1 | Ex. 2 | Ex. 3 | Ex. 4 | Ex. 5 |
|---|---|---|---|---|---|---|---|
| Area 1 | 2nd Protective Film | | T-1 | T-1 | N-10 | N-1 | T-1 |
| | Intervenient Member | | P-Ad-1 | P-Ad-1 | U-Ad-1 | U-Ad-1 | P-Ad-1 |
| | 1st Polarizing Element Angle of Absorption Axis (°) | | 0 | 0 | 0 | 0 | 0 |
| | Area O | Intervenient Member | P-Ad-1 | P-Ad-1 | U-Ad-1 | U-Ad-1 | U-Ad-1 |
| | | 1st Protective Film | T-1 | T-1 | N-12 | N-5 | N-5 |
| | | Intervenient Member | A-Co-20 | A-Co-20 | A-Co-20 | A-Co-20 | A-Co-20 |
| Substrate on Observation Side | | | | | | | |
| Liquid Crystal Rlc (nm) | | | 290 | 290 | 290 | 290 | 290 |
| Substrate on Rear Side | | | | | | | |
| Area 2 | Area B | Intervenient Member | A-Co-20 | A-Co-20 | A-Co-20 | A-Co-20 | A-Co-20 |
| | | 3rd Protective Film | N-15 | N-8 | N-12 | N-5 | N-5 |
| | | Intervenient Member | U-Ad-1 | U-Ad-1 | U-Ad-1 | U-Ad-1 | U-Ad-1 |
| | | 2nd Polarizing Element Angle of Absorption Axis (°) | 90 | 90 | 90 | 90 | 90 |
| | | Intervenient Member | U-Ad-1 | P-Ad-1 | U-Ad-1 | U-Ad-1 | P-Ad-1 |
| | | 4th Protective Film | N-10 | T-1 | N-10 | N-1 | T-1 |
| Number of Ad/Cohesive Layer (≧10 μm) in Area 1 | | | 1 | 1 | 1 | 1 | 1 |
| Number of Ad/Cohesive Layer (≧10 μm) in Area 2 | | | 1 | 1 | 1 | 1 | 1 |
| Area O Contains Film Member A*? | | | Yes (Y) | N | N | N | N |
| Area B Contains Film Member A*? | | | No (N) | N | N | N | N |
| L − L′[mm] | 1st Polarizing Element | | 2 | 2 | 2 | 2 | 2 |
| | 2nd Polarizing Element | | 2 | 2 | 2 | 2 | 2 |
| L − I[mm] | 1st Polarizing Element | | 2 | 2 | 2 | 2 | 2 |
| | 2nd Polarizing Element | | 2 | 2 | 2 | 2 | 2 |
| Seal | 1st Polarizing Element | | No (N) | N | N | N | N |
| Treatment | 2nd Polarizing Element | | N | N | N | N | N |
| R1 + R3 − Rlc (nm) | | | 11 | 14 | 5 | 8 | 8 |

| | | | Ex. 6 | Ex. 7 | Ex. 8 | Ex. 9 | Ex. 10 |
|---|---|---|---|---|---|---|---|
| Area 1 | 2nd Protective Film | | T-1 | T-1 | T-1 | T-1 | T-1 |
| | Intervenient Member | | P-Ad-1 | P-Ad-1 | P-Ad-1 | P-Ad-1 | P-Ad-1 |
| | 1st Polarizing Element Angle of Absorption Axis (°) | | 0 | 0 | 0 | 0 | 0 |
| | Area O | Intervenient Member | P-Ad-1 | U-Ad-1 | U-Ad-1 | U-Ad-1 | U-Ad-1 |
| | | 1st Protective Film | T-3 | N-8 | N-1 | N-1 | N-16 |
| | | Intervenient Member | A-Co-20 | A-Co-20 | A-Co-20 | A-Co-20 | A-Co-20 |
| Substrate on Observation Side | | | | | | | |
| Liquid Crystal Rlc (nm) | | | 290 | 290 | 290 | 290 | 290 |
| Substrate on Rear Side | | | | | | | |
| Area 2 | Area B | Intervenient Member | A-Co-20 | A-Co-20 | A-Co-20 | A-Co-20 | A-Co-20 |
| | | 3rd Protective Film | N-1 | T-1 | N-6 | N-3 | N-16 |
| | | Intervenient Member | U-Ad-1 | P-Ad-1 | U-Ad-1 | U-Ad-1 | U-Ad-1 |
| | | 2nd Polarizing Element Angle of Absorption Axis (°) | 90 | 90 | 90 | 90 | 90 |
| | | Intervenient Member | P-Ad-1 | P-Ad-1 | P-Ad-1 | P-Ad-1 | P-Ad-1 |
| | | 4th Protective Film | T-1 | T-1 | T-1 | T-1 | T-1 |
| Number of Ad/Cohesive Layer (≧10 μm) in Area 1 | | | 1 | 1 | 1 | 1 | 1 |
| Number of Ad/Cohesive Layer (≧10 μm) in Area 2 | | | 1 | 1 | 1 | 1 | 1 |
| Area O Contains Film Member A*? | | | Y | N | N | N | N |
| Area B Contains Film Member A*? | | | N | Y | N | N | N |
| L − L′[mm] | 1st Polarizing Element | | 2 | 2 | 2 | 2 | 2 |
| | 2nd Polarizing Element | | 2 | 2 | 2 | 2 | 2 |
| L − I[mm] | 1st Polarizing Element | | 2 | 2 | 2 | 2 | 2 |
| | 2nd Polarizing Element | | 2 | 2 | 2 | 2 | 2 |
| Seal | 1st Polarizing Element | | N | N | N | N | N |
| Treatment | 2nd Polarizing Element | | N | N | N | N | N |
| R1 + R3 − Rlc (nm) | | | 20 | 14 | 29 | 3 | 29 |

*Film Member A has an absolute value of photoelastic coefficient of $10 \times 10^{-8}$ cm$^2$/N or more or has a water absorption of 2.0% or more.

TABLE 3

|  |  |  | Ex. 11 | Ex. 12 | Ex. 13 | Ex. 14 | Ex. 15 | Ex. 16 | Ex. 17 |
|---|---|---|---|---|---|---|---|---|---|
| Area 1 | 2nd Protective Film | | T-1 | T-1 | T-1 | T-1 | N-1 | N-1 | T-1 |
| | Intervenient Member | | P-Ad-1 | P-Ad-1 | P-Ad-1 | P-Ad-1 | U-Ad-1 | U-Ad-1 | P-Ad-1 |
| | 1st Polarizing Element | | 0 | 0 | 0 | 0 | 0 | 45 | 0 |
| | Area O | Intervenient Member | P-Ad-1 | U-Ad-1 | P-Ad-1 | P-Ad-1 | U-Ad-1 | U-Ad-1 | U-Ad-1 |
| | | 1st Protective Film | T-1 | N-4 | T-1 | T-1 | N-5 | N-5 | N-5 |
| | | Intervenient Member | A-Co-20 | A-Co-20 | A-Co-20 | A-Co-20 | A-Co-20 | A-Co-20 | A-Co-20 |
| Substrate on Observation Side | | | | | | | | | |
| Liquid Crystal Rlc (nm) | | | 320 | 320 | 260 | 290 | 290 | 290 | 290 |
| Substrate on Rear Side | | | | | | | | | |
| Area 2 | Area B | Intervenient Member | A-Co-20 | A-Co-20 | A-Co-20 | A-Co-20 | A-Co-20 | A-Co-20 | A-Co-20 |
| | | 3rd Protective Film | N-14 | N-4 | N-9 | N-8 | N-5 | N-5 | N-5 |
| | | Intervenient Member | U-Ad-1 | U-Ad-1 | U-Ad-1 | U-Ad-1 | U-Ad-1 | U-Ad-1 | U-Ad-1 |
| | 2nd Polarizing Element | | 90 | 90 | 90 | 90 | 90 | 135 | 90 |
| | Intervenient Member | | P-Ad-1 | P-Ad-1 | P-Ad-1 | P-Ad-1 | U-Ad-1 | U-Ad-1 | P-Ad-1 |
| | 4th Protective Film | | T-1 | T-1 | T-1 | T-1 | N-1 | N-1 | T-1 |
| Number of Ad/Cohesive Layer ($\geqq 10$ μm) in Area 1 | | | 1 | 1 | 1 | 1 | 1 | 1 | 1 |
| Number of Ad/Cohesive Layer ($\geqq 10$ μm) in Area 2 | | | 1 | 1 | 1 | 1 | 1 | 1 | 1 |
| Area O Contains Film Member A$^{\times}$? | | | Yes (Y) | N | Y | Y | N | N | N |
| Area B Contains Film Member A$^{\times}$? | | | No (N) | N | N | N | N | N | N |
| L − L'[mm] | 1st Polarizing Element | | 2 | 2 | 2 | 2 | 2 | 2 | 10 |
| | 2nd Polarizing Element | | 2 | 2 | 2 | 10 | 2 | 2 | 10 |
| L − I[mm] | 1st Polarizing Element | | 2 | 2 | 2 | 2 | 10 | 2 | 10 |
| | 2nd Polarizing Element | | 2 | 2 | 2 | 2 | 10 | 2 | 10 |
| Seal | 1st Polarizing Element | | No (N) | N | N | N | N | Yes (Y) | Y |
| Treatment | 2nd Polarizing Element | | N | N | N | N | N | Y | Y |
| R1 + R3 − Rlc (nm) | | | 7 | 13 | 27 | 14 | 8 | 8 | 8 |

$^{\times}$Film Member A has an absolute value of photoelastic coefficient of $10 \times 10^{-8}$ cm$^2$/N or more or has a water absorption of 2.0% or more.

(2-1) Examples in Which One Film having a Large Retardation is Used

EXAMPLE 1

In this Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, the T-1 as the first protective film, an acrylic cohesive agent layer having a thickness of 20 μm as the cohesive layer, a substrate on the observation side a liquid crystal layer having a Rlc of 290 nm, a substrate on the rear side, the acrylic cohesive agent layer having a thickness of 20 μm as the cohesive layer, a N-15 as the third protective film, a urethane adhesive agent layer having a thickness of 1 μm or less as the adhesive layer, a PVA polarizing element whose angle of the absorption axis is 90° as the second polarizing element, the urethane adhesive agent layer having a thickness of 1 μm or less as the adhesive layer, and a N-10 as the fourth protective film in this order.

When a maximum breadth determined in the absorption axis direction of the polarizing elements was defined as L and a maximum breadth determined in the same direction of a display effective area of the liquid crystal display device was defined as L', the first polarizing element satisfied a relationship of L−L'=2 mm, and the second polarizing element also satisfied a relationship of L−L'=2 mm. Furthermore, a maximum breadth determined in the absorption axis direction of the polarizing elements was defined as L and a maximum breadth determined in the absorption axis direction of an aperture area of the bezel was defined as 1, the first polarizing element satisfied a relationship of L−l=2 mm, and the second polarizing element also satisfied a relationship of L−l=2 mm. And neither the first polarizing element nor the second polarizing element was provided with the sealing treatment.

EXAMPLE 2

In this Example, a liquid crystal display device was produced in the same manner as in Example 1, except that a N-8 was used as the third protective film, a T-1 as the fourth protective film, and a PVA adhesive agent layer having a thickness of 1 μm or less as the adhesive layer for adhering the second polarizing element and the fourth protective film.

(2-2) Examples in which Two Films having a Large Retardation were Used

EXAMPLE 3

In this Example, a liquid crystal display device was produced by stacking, from the observation side, a N-10 as the second protective film, a urethane adhesive agent layer having a thickness of 1 μm or less as the adhesive layer, a PVA polarizing element whose angle of the absorption axis is 0° as the first polarizing element, the urethane adhesive agent layer having a thickness of 1 μm or less as the adhesive layer, a N-12 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm thickness as the cohesive layer, the N-12 as the third protective film, the urethane adhesive agent layer having a thickness of 1 μm or less as the adhesive layer, a PVA polarizing element whose angle of the absorption axis is 90° as the second polarizing element, the urethane adhesive agent layer having a thickness of 1 μm or less as the adhesive layer, and a N-10 as the fourth protective film in this order.

The first polarizing element satisfied a relationship of L−L'=2 mm, and the second polarizing element also satisfied a relationship of L−L'=2 mm. The first polarizing element satisfied a relationship of L−l=2 mm, and the second polarizing element also satisfied a relationship of L−l=2 mm. And neither the first polarizing element nor the second polarizing element was provided with the sealing treatment.

EXAMPLE 4

In this Example, a liquid crystal display device was produced in the same manner as in Example 3, except that a N-5 was used as the first protective film, the N-5 as the second protective film, the N-5 as the third protective film, and a N-1 as the fourth protective film.

EXAMPLE 5

In this Example, a liquid crystal display device was produced in the same manner as in Example 3, except that a N-5 was used as the first protective film, a T-1 as the second protective film, the N-5 as the third protective film, the T-1 as the fourth protective film, and a PVA adhesive agent layer having a thickness of 1 μm or less as the adhesive layer for adhering the first polarizing element and the second protective film, and as the adhesive layer for adhering the second polarizing element and the fourth protective film.

(2-3) Examples in which no NB Protective Film is Disposed as a Protective Film having the Larger Corrected Retardation R in the Thickness Direction or on the Rear Side

EXAMPLE 6

In this Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, a T-3 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-1 as the third protective film, a urethane adhesive agent layer having a thickness of 1 nm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of L−L'=2 mm, and the second polarizing element also satisfied a relationship of L−L'=2 mm. The first polarizing element satisfied a relationship of L−l=2 mm, and the second polarizing element also satisfied a relationship of L−l=2 mm. And neither the first polarizing element nor the second polarizing element was provided with the sealing treatment.

EXAMPLE 7

In this Example, a liquid crystal display device was produced in the same manner as in Example 6, except that a N-8 was used as the first protective film, a T-1 as the third protective film, a urethane adhesive agent layer having a thickness of 1 μm or less as the adhesive layer for adhering the first polarizing element and the first protective film, and a PVA adhesive agent layer having a thickness of 1 μm or less as the adhesive layer for adhering the second polarizing element and the third protective film. The first polarizing element satisfied a relationship of L−L'=2 mm, and the second polarizing element also satisfied a relationship of L−L'=2 mm. The first polarizing element satisfied a relationship of L−l=2 mm, and the second polarizing element also satisfied a relationship of L−l=2 mm.

(2-4) Examples in which One NB Protective Film having a Large Retardation was Used, and the Retardation was Designed Near Limit of Securing of Sufficient View Angle.

EXAMPLE 8

In this Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, a urethane adhesive agent layer having a thickness of 1 μm or less as the adhesive layer, a N-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-6 as the third protective film, the urethane adhesive agent layer having a thickness of 1 nm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of L−L'=2 mm, and the second polarizing element also satisfied a relationship of L−L'=2 mm. The first polarizing element satisfied a relationship of L−l=2 mm, and the second polarizing element also satisfied a relationship of L−l=2 mm. And neither the first polarizing element nor the second polarizing element was provided with the sealing treatment.

EXAMPLE 9

In this Example, a liquid crystal display device was produced in the same manner as in Example 8, except that a N-3 was used as the third protective film.

(2-5) Example in which Two NB Protective Films Each having a Large Retardation and the Retardation was Designed Near Limit of Securing of Sufficient View Angle

EXAMPLE 10

In this Example, a liquid crystal display device was produced in the same manner as in Example 8, except that a N-16 was used as the first protective film and as the third protective film.

(2-6) Examples in which the Rlc of the Liquid Crystal Display Cell was Changed

EXAMPLE 11

In this Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, a PVA adhesive agent layer having a thickness of 1 μm or less as the adhesive layer, the T-1 as the first protective film, an acrylic cohesive agent layer having a thickness of 20 μm as the cohesive layer, a substrate on the observation side, a liquid crystal layer having a Rlc of 320 nm, a substrate on the rear side, the acrylic cohesive agent layer having a thickness of 20 μm as the cohesive layer, a N-14 as the third protective film, a urethane adhesive agent layer having a thickness of 1 nm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of L–L'=2 mm, and the second polarizing element also satisfied a relationship of L–L'=2 mm. The first polarizing element satisfied a relationship of L–l=2 mm, and the second polarizing element also satisfied a relationship of L–l=2 mm. And neither the first polarizing element nor the second polarizing element was provided with the sealing treatment.

EXAMPLE 12

In this Example, a liquid crystal display device was produced in the same manner as in Example 11, except that a N-4 was used as the first protective film and as the third protective film, a urethane adhesive agent layer having a thickness of 1 μm or less as the adhesive layer for adhering the first polarizing element and the first protective film.

EXAMPLE 13

In this Example, a liquid crystal display device was produced in the same manner as in Example 11, except that a liquid crystal layer having a Rlc of 260 nm was used as the liquid crystal display cell, and a N-9 as the third protective film.

(2-7) Examples in which the Polarizing Element(s) were Provided with Measures Against the Crack

EXAMPLE 14

In this Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, the T-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-8 as the third protective film, a urethane adhesive agent layer having a thickness of 1 μm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of L–L'=2 mm, and the second polarizing element satisfied a relationship of L–L'=10 mm. The first polarizing element satisfied a relationship of L–l=2 mm, and the second polarizing element also satisfied a relationship of L–l=2 mm. And neither the first polarizing element nor the second polarizing element was provided with the sealing treatment.

EXAMPLE 15

In this Example, a liquid crystal display device was produced in the same manner as in Example 14, except that a N-1 was used as the second protective film and as the fourth protective film, a N-5 as the first protective film and the third protective film, a urethane adhesive agent layer having a thickness of 1 μm or less as all of the adhesive layers.

The first polarizing element satisfied a relationship of L–L'=2 mm, and the second polarizing element also satisfied a relationship of L–L'=2 mm. The first polarizing element satisfied a relationship of L–l=10 mm, and the second polarizing element also satisfied a relationship of L–l=10 mm. And neither the first polarizing element nor the second polarizing element was provided with the sealing treatment.

EXAMPLE 16

In this Example, a liquid crystal display device was produced in the same manner as in Example 14, except that a N-1 was used as the second protective film and as the fourth protective film, a N-5 as the first protective film and the third protective film, and a urethane adhesive agent layer having a thickness of 1 μm or less as all of the adhesive layers. The second polarizing element also satisfied a relationship of L–L'=2 mm. And the angle of the absorption axis of the first polarizing element was changed to 45°, and the angle of the absorption axis of the second polarizing element was changed to 135°. Both of the first polarizing element and the second polarizing element were provided with the sealing treatment.

EXAMPLE 17

In this Example, a liquid crystal display device was produced in the same manner as in Example 14, except that a N-5 was used as the first protective film and as the third protective film, and a urethane adhesive agent layer having a thickness of 1 μm or less as the adhesive layer for adhering the first polarizing element and the first protective film. The first polarizing element also satisfied a relationship of L–L'=10 mm. The first polarizing element satisfied a relationship of L–l=10 mm, and the second polarizing element also satisfied a relationship of L–l=10 mm. Both of the first polarizing element and the second polarizing element were provided with the sealing treatment.

Comparative Examples and Reference Examples each illustrating a liquid crystal display device produced by changing a component in the liquid crystal display device according to the present Embodiment will, hereinafter, be described. The following Table 4 shows each configuration of the liquid crystal display devices in Comparative Examples and Reference Examples.

TABLE 4

|  |  |  | Com Ex. 1 | Com Ex. 2 | Com Ex. 3 | Com Ex. 4 | Com Ex. 5 |
|---|---|---|---|---|---|---|---|
| Area 1 | 2nd Protective Film | | T-1 | N-10 | N-10 | T-1 | T-1 |
| | Intervenient Member | | P-Ad-1 | A-Co-20 | A-Co-50 | P-Ad-1 | P-Ad-1 |
| | 1st Polarizing Element | | 0 | 0 | 0 | 0 | 0 |
| | Area O | Intervenient Member | P-Ad-1 | A-Co-20 | A-Co-50 | P-Ad-1 | P-Ad-1 |
| | | 1st Protective Film | T-1 | N-12 | N-12 | T-1 | T-1 |
| | | Intervenient Member | A-Co-20 | A-Co-20 | A-Co-50 | A-Co-20 | A-Co-20 |
| | | | | | | | N-2 |
| | | | | | | | A-Co-20 |

TABLE 4-continued

|  |  |  |  |  |  |  |  |
|---|---|---|---|---|---|---|---|
| Substrate on Observation Side |  |  |  |  |  |  |  |
| Liquid Crystal Rlc (nm) |  |  | 290 | 290 | 290 | 290 | 290 |
| Substrate on Rear Side |  |  |  |  |  |  |  |
| Area 2 | Area B | Intervenient Member | A-Co-20 | A-Co-20 | A-Co-50 | A-Co-20 N-13 A-Co-20 | A-Co-20 N-2 A-Co-20 |
|  |  | 3rd Protective Film | N-15 | N-12 | N-12 | T-1 | T-1 |
|  |  | Intervenient Member | A-Co-20 | A-Co-20 | A-Co-50 | P-Ad-1 | P-Ad-1 |
|  |  | 2nd Polarizing Element | 90 | 90 | 90 | 90 | 90 |
|  |  | Intervenient Member | U-Ad-1 | A-Co-20 | A-Co-50 | P-Ad-1 | P-Ad-1 |
|  |  | 4th Protective Film | N-10 | N-10 | N-10 | T-1 | T-1 |
| Number of Ad/Cohesive Layer ($\geqq 10$ μm) in Area 1 |  |  | 1 | 3 | 3 | 1 | 2 |
| Number of Ad/Cohesive Layer ($\geqq 10$ μm) in Area 2 |  |  | 2 | 3 | 3 | 2 | 2 |
| Area O Contains Film Member A✕? |  |  | Yes (Y) | N | N | Y | Y |
| Area B Contains Film Member A✕? |  |  | No (N) | N | N | Y | Y |
| L – L'[mm] | 1st Polarizing Element |  | 2 | 2 | 2 | 2 | 2 |
|  | 2nd Polarizing Element |  | 2 | 2 | 2 | 2 | 2 |
| L – l[mm] | 1st Polarizing Element |  | 2 | 2 | 2 | 2 | 2 |
|  | 2nd Polarizing Element |  | 2 | 2 | 2 | 2 | 2 |
| Seal | 1st Polarizing Element |  | No (N) | N | N | N | N |
| Treatment | 2nd Polarizing Element |  | N | N | N | N | N |
| R1 + R3 – Rlc (nm) |  |  | 11 | 5 | 5 | 25✕✕ | 29✕✕ |

|  |  |  | Com Ex. 6 | Com Ex. 7 | Ref Ex. 1 | Ref Ex. 2 | Ref Ex. 3 |
|---|---|---|---|---|---|---|---|
| Area 1 | 2nd Protective Film |  | T-1 | T-1 | T-1 | T-1 | T-1 |
|  | Intervenient Member |  | P-Ad-1 | P-Ad-1 | P-Ad-1 | P-Ad-1 | P-Ad-1 |
|  | 1st Polarizing Element |  | 0 | 0 | 0 | 0 | 0 |
|  | Area O | Intervenient Member | P-Ad-1 | P-Ad-1 | P-Ad-1 | P-Ad-1 | U-Ad-1 |
|  |  | 1st Protective Film | T-1 | T-1 | T-1 | T-1 | N-7 |
|  |  | Intervenient Member | A-Co-20 | A-Co-20 | A-Co-20 | A-Co-20 | A-Co-20 |
| Substrate on Observation Side |  |  |  |  |  |  |  |
| Liquid Crystal Rlc (nm) |  |  | 290 | 290 | 290 | 290 | 290 |
| Substrate on Rear Side |  |  |  |  |  |  |  |
| Area 2 | Area B | Intervenient Member | A-Co-20 | A-Co-20 | A-Co-20 | A-Co-20 | A-Co-20 |
|  |  | 3rd Protective Film | P-1 | T-2 | N-11 | N-17 | N-7 |
|  |  | Intervenient Member | U-Ad-1 | P-Ad-1 | U-Ad-1 | U-Ad-1 | U-Ad-1 |
|  |  | 2nd Polarizing Element | 90 | 90 | 90 | 90 | 90 |
|  |  | Intervenient Member | P-Ad-1 | P-Ad-1 | P-Ad-1 | P-Ad-1 | P-Ad-1 |
|  |  | 4th Protective Film | T-1 | T-1 | T-1 | T-1 | T-1 |
| Number of Ad/Cohesive Layer ($\geqq 10$ μm) in Area 1 |  |  | 1 | 1 | 1 | 1 | 1 |
| Number of Ad/Cohesive Layer ($\geqq 10$ μm) in Area 2 |  |  | 1 | 1 | 1 | 1 | 1 |
| Area O Contains Film Member A✕? |  |  | Y | Y | Y | Y | N |
| Area B Contains Film Member A✕? |  |  | Y | Y | N | N | N |
| L – L'[mm] | 1st Polarizing Element |  | 2 | 2 | 2 | 2 | 2 |
|  | 2nd Polarizing Element |  | 2 | 2 | 2 | 2 | 2 |
| L – l[mm] | 1st Polarizing Element |  | 2 | 2 | 2 | 2 | 2 |
|  | 2nd Polarizing Element |  | 2 | 2 | 2 | 2 | 2 |
| Seal | 1st Polarizing Element |  | N | N | N | N | N |
| Treatment | 2nd Polarizing Element |  | N | N | N | N | N |
| R1 + R3 – Rlc (nm) |  |  | 7 | 17 | –6 | 37 | 38 |

✕Film Member A has an absolute value of photoelastic coefficient of $10 \times 10^{-8}$ cm$^2$/N or more or has a water absorption of 2.0% or more.
✕✕These values are calculated by adding retardation of all films having retardation which include first and third protective films.

(3-1) Comparative Examples in which an Acrylic Cohesive Agent Layer(s) having a Thickness of 20 μm or More was/were Used for Adhering the Polarizing Element(s) and the Protective Film(s)

COMPARATIVE EXAMPLE 1

In this Comparative Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, the T-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-15 as the third protective film, the acrylic cohesive agent layer having a thickness of 20 μm as the cohesive layer, a PVA polarizing element whose angle of the absorption axis is 90° as the second polarizing element, a urethane adhesive agent layer having a thickness of 1 μm or less as the adhesive layer, and a N-10 as the fourth protective film in this order.

The first polarizing element satisfied a relationship of L–L'=2 mm, and the second polarizing element also satisfied a relationship of L–L'=2 mm. The first polarizing element satisfied a relationship of L–l=2 mm, and the second polarizing element also satisfied a relationship of L–l=2 mm. And neither the first polarizing element nor the second polarizing element was provided with the sealing treatment.

COMPARATIVE EXAMPLE 2

In this Comparative Example, a liquid crystal display device was produced in the same manner as in Comparative Example 1, except that a N-10 was used as the second protective film, a N-12 as the first protective film and as the third protective film, an acrylic cohesive agent layer having a thickness of 20 μm was used for all of the adhesive layers.

COMPARATIVE EXAMPLE 3

In this Example, a liquid crystal display device was produced in the same manner as in Comparative Example 2, except that an acrylic adhesive agent layer having a thickness of 50 μm was used as the cohesive layers.

(3-2) Examples in which Two or More Cohesive Layers having a Thickness of 10 μm or More and the TAC Films were Disposed between the Polarizing Elements

COMPARATIVE EXAMPLE 4

In this Comparative Example, a retardation film was disposed between the substrate on the rear side and the third protective film with a cohesive agent layer between each member, in addition to the above-mentioned basic configuration of the liquid crystal display device. Specifically, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, the T-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-13 as the retardation film, the acrylic cohesive agent layer having a thickness of 20 μm as the cohesive layer, the T-1 as the third protective film, the PVA adhesive agent layer having a thickness of 1 μm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of $L-L'=2$ mm, and the second polarizing element also satisfied a relationship of $L-L'=2$ mm. The first polarizing element satisfied a relationship of $L-l=2$ mm, and the second polarizing element also satisfied a relationship of $L-l=2$ mm. And neither the first polarizing element nor the second polarizing element was provided with the sealing treatment.

COMPARATIVE EXAMPLE 5

In this Comparative Example, a retardation film was disposed between the substrate on observation side and the first protective film, and between the substrate on the rear side and the third protective film with a cohesive agent layer between each other, in addition to the above-mentioned basic configuration of the liquid crystal display device. Specifically, a liquid crystal display device was produced in the same manner as in Comparative Example 4, except that an acrylic cohesive agent layer having a thickness of 20 μm as the cohesive layer, a N-2 as the retardation film, and the acrylic cohesive agent layer having a thickness of 20 μm as the cohesive layer were disposed in an area between the first protective film and the substrate on the observation side, and the N-2 was used as the retardation film provided between the substrate on the rear side and the third protective film.

(3-3) Examples in which Protective Films Each having a Large Photoelastic Coefficient and having a Large Water Absorption were Used as the Protective Films between the Polarizing Elements

COMPARATIVE EXAMPLE 6

In this Comparative Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less as the adhesive layer, the T-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a P-1 as the third protective film, a urethane adhesive agent layer having a thickness of 1 μm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of $L-L'=2$ mm, and the second polarizing element also satisfied a relationship of $L-L'=2$ mm. The first polarizing element satisfied a relationship of $L-l=2$ mm, and the second polarizing element also satisfied a relationship of $L-l=2$ mm. And neither the first polarizing element nor the second polarizing element was provided with the sealing treatment.

COMPARATIVE EXAMPLE 7

In this Comparative Example, a liquid crystal display device was produced in the same manner as in Comparative Example 6, except that a T-2 was used as the third protective film, a PVA adhesive agent layer having a thickness of 1 μm or less as the adhesive layer for adhering the fourth protective film and the second polarizing element.

(3-4) Examples in which the Rlc of the Liquid Crystal Display Cell was Changed

REFERENCE EXAMPLE 1

In this Reference Example, a liquid crystal display device was produced by stacking, from the observation side, a T-1 as the second protective film, a PVA adhesive agent layer having a thickness of 1 μm or less as the adhesive layer, a PVA polarizing element whose angle of the absorption axis is 0° as the first polarizing element, the PVA adhesive agent layer having a thickness of 1 μm or less thickness as the adhesive layer, the T-1 as the first protective film, an acrylic cohesive agent layer having a thickness of 20 μm as the cohesive layer, a substrate on the observation side, a liquid crystal layer having a Rlc of 290 nm, a substrate on the rear side, the acrylic cohesive agent layer having a thickness of 20 μm as the cohesive layer, a N-1 as the third protective film, a urethane adhesive agent layer having a thickness of having a thickness of 1 μm or less as the adhesive layer, a PVA polarizing element whose angle of the absorption axis is 90° as the second polarizing element, the PVA adhesive agent layer having a thickness of 1 μm or less as the adhesive layer, and the T-1 as the fourth protective film in this order.

The first polarizing element satisfied a relationship of L−L'=2 mm, and the second polarizing element also satisfied a relationship of L−L'=2 mm. The first polarizing element satisfied a relationship of L−l=2 mm, and the second polarizing element also satisfied a relationship of L−l=2 mm. And neither the first polarizing element nor the second polarizing element was provided with the sealing treatment.

REFERENCE EXAMPLE 2

In this Reference Example, a liquid crystal display device was produced in the same manner as in Reference Example 1, except that a N-17 was used as the third protective film.

REFERENCE EXAMPLE 3

In this Reference Example, a liquid crystal display device was produced in the same manner as in Reference Example 1, except that a N-7 was used as the first protective film and as the third protective film, and a urethane adhesive agent layer having a thickness of 1 μm or less thickness as the adhesive layer for adhering the first protective film and the first polarizing element.

(Evaluation Method)

Evaluation methods for liquid crystal display devices produced in Examples, Comparative Examples and Reference Examples will, hereinafter, be described. These liquid crystal display devices were each evaluated for contrast ratio, void (excessively bright image), moisture resistance, crack of polarizing element, and foaming and peeling. Table 5 shows results in each liquid crystal display device.

(4-1) Evaluation for Contrast Ratio

Using a back light system for large liquid crystal display devices as a light source, brightness at black display and brightness at white display were each measured at an elevation angle of 0° (the normal direction to the substrate face of the substrate on the observation side), and then brightness at black display and brightness at white display were each measured at an elevation angle of 60° (a direction inclined by 60° from the normal direction) while changing an azimuthal angle by 5° at azimuthal angles of 0 to 360°. A contrast ratio CR (0) at an elevation angle of 0° and a contrast ratio CR (Φ, 60) at an elevation angle of 60° were determined from a ratio of the brightness at black display and the brightness at white display (brightness at white display/brightness at black display). The contrast ratio CR (Φ, 60) varies depending on the azimuthal angles. Table 5 shows a minimum value of CR (Φ, 60)/CR(0). If a minimum value of CR (Φ, 60)/CR(0) was 0.025 or more, practically enough view angle was obtained.

(4-2) Evaluation of Void (Excessively Bright Image)

The liquid crystal display device was subjected to a storage test for 1000 hours at 80° C. and under dry condition. Then, brightness at black display is measured at 9 places of 3×3 matrix including four corners and the center of the display effective area. And a maximum value of the brightness/an average value of the brightness was defined as C1. Furthermore, the liquid crystal display device was subjected to a storage test for 1000 hours at 40° C. and 90% RH. Then, the above-mentioned measurement was repeated, and a maximum value of the brightness/an average value of the brightness was defined as C2. Then, based on C1 and C2, evaluation for void was carried out according to the following evaluation standards. A back light system for large liquid crystal display devices was also used as a light source, similarly in the evaluation for contrast ratio.

Excellent: Both C1 and C2 are 1.3 or less.
Good: Both C1 and C2 are 1.7 or less.
Average: Both C1 and C2 are 2.0 or less.
Poor: Either C1 or C2 is larger than 2.0.

(4-3) Evaluation for Moisture Resistance

The liquid crystal display device was subjected to a storage test for 1000 hours at 50° C. and 95% RH. Then, a contrast ratio CR (0) was measured at the center of the display effective area in the same manner as in the above-mentioned evaluation for contrast ratio (4-1), and a ratio of the contrast ratio CR (0) after the storage test to the contrast ratio CR (0) before the storage test was defined as C3. And appearance was subjected to eye observation to determine existence of a defect such as decoloration at edges of the polarizing element. Based on C3 and a result of the eye observation, evaluation for moisture resistance was carried out according to the following evaluation standards.

Excellent: C3 is 0.90 or more and no defect at edges is observed.
Good: C3 is 0.85 or more and no defect at edges is observed.
Average: C3 is 0.80 or more and no defect at edges is observed.
Poor: C3 is less than 0.80, or defects at edges are observed.

(4-4) Evaluation for Crack of Polarizing Element (PVA)

The liquid crystal display device was subjected to a humidification test for 48 hours at 60° C. and 95% RH. Then, the device was subjected to a heat shock test, in which the device was exposed to −35° C. (for one hour) and then 70° C. (for one hour) repeatedly and alternatively up to 400 cycles. Then, the device was subjected to eye observation for determining whether a defect such as crack of the polarizing element inside the display effective area occurred or not. And evaluation for crack of the polarizing element was carried out according to the following evaluation standards.

Excellent: No defect is observed inside the display effective area after 400 cycles.
Good: No defect is observed inside the display effective area after 300 cycles.
Average: No defect is observed inside the display effective area after 200 cycles.
Poor: A defect is observed inside the display effective area after 200 cycles.

(4-5) Evaluation for Foaming and Peeling (a) A storage test at 80° C. and under dry condition up to 1000 hours, (b) a storage test at 50° C. and 95% RH up to 1000 hours, and (c) a heat shock test, in which the device was exposed to −35° C. (for one hour) and then 70° C. (for one hour) repeatedly and alternatively up to 400 cycles were carried out using different samples (devices) for each test. The sample after each test was subjected to eye observation for determining whether a defect such as crack of the polarizing element inside the display effective area occurred or not. And evaluation for foaming and peeling was carried out according to the following evaluation standards.

Good: No foaming and peeling are observed in all of the tests performed up to maximum test hour and maximum test cycle, or foaming and peeling are observed only at edges outside the display effective area.

Average: No foaming and peeling are observed in all of the tests performed up to maximum test hour, up to half of maximum test cycle, and up to maximum cycle, or foaming and peeling are observed only at edges outside the display effective area.

Poor: Foaming and peeling are observed inside the display effective area in any of the test performed up to maximum test hour, up to half of cycle, and up to maximum cycle.

TABLE 5

|  | min {CR(Φ, 60)/ CR(0)} | Void | Moisture resistance | PVA crack | Foaming and peeling |
|---|---|---|---|---|---|
| Ex. 1 | 0.037 | Good | Poor | Poor | Good |
| Ex. 2 | 0.035 | Good | Poor | Good | Good |
| Ex. 3 | 0.039 | Excellent | Excellent | Poor | Good |
| Ex. 4 | 0.039 | Excellent | Excellent | Poor | Good |
| Ex. 5 | 0.038 | Excellent | Good | Good | Good |
| Ex. 6 | 0.035 | Poor | Poor | Good | Good |
| Ex. 7 | 0.037 | Poor | Poor | Good | Good |
| Ex. 8 | 0.027 | Excellent | Good | Good | Good |
| Ex. 9 | 0.027 | Excellent | Poor | Good | Good |
| Ex. 10 | 0.029 | Excellent | Excellent | Good | Good |
| Ex. 11 | 0.042 | Good | Poor | Good | Good |
| Ex. 12 | 0.045 | Excellent | Excellent | Good | Good |
| Ex. 13 | 0.031 | Good | Poor | Good | Good |
| Ex. 14 | 0.035 | Good | Poor | Excellent | Good |
| Ex. 15 | 0.038 | Excellent | Excellent | Excellent | Good |
| Ex. 16 | 0.039 | Excellent | Excellent | Excellent | Good |
| Ex. 17 | 0.036 | Excellent | Good | Excellent | Good |
| Com Ex. 1 | 0.037 | Good | Bad | Poor | Poor |
| Com Ex. 2 | 0.039 | Poor | Bad | Poor | Poor |
| Com Ex. 3 | 0.039 | Poor | Bad | Bad | Bad |
| Com Ex. 4 | 0.036 | Bad | Bad | Excellent | Good |
| Com Ex. 5 | 0.038 | Bad | Bad | Excellent | Good |
| Com Ex. 6 | 0.041 | Bad | Poor | Good | Good |
| Com Ex. 7 | 0.038 | Bad | Bad | Excellent | Good |
| Ref Ex. 1 | 0.022 | Good | Poor | Excellent | Good |
| Ref Ex. 2 | 0.021 | Good | Poor | Good | Good |
| Ref Ex. 3 | 0.023 | Good | Good | Good | Good |

CONCLUSION

In Examples, the adhesive layer having a thickness of 1 μm or less was used for attaching the protective film and the polarizing element, and the NB resin film having a small absolute value of a photoelastic coefficient, a low water absorption and a low moisture permeability was used as the protective film. Therefore, as shown in Table 5, the liquid crystal display devices in Examples are comprehensively superior to those in Comparative Examples in durability such as void, moisture resistance, crack of PVA, and foaming and peeling. In Examples 3 to 5, 8 to 10, and 12, the NB resin film was used as the first protective film and the third protective film. Therefore, the liquid crystal display devices in these Examples are particularly excellent in durability. In Examples 6 and 7, the NB resin film was used, but the TAC film was used as the protective film having the larger corrected retardation R in the thickness direction in Example 6, and as the protective film on the rear side (area B) easily influenced by heat of a backlight in Examples 6 and 7. Therefore, the devices in Examples 6 and 7 had durability slightly lower than that of the devices in other Examples. In Examples 8 to 10, the retardation design of the NB resin film was changed, and in Examples 11 to 13, the retardation design of the liquid crystal display cell was changed. However, each device in these Examples can provide sufficient display quality. In Examples 14 to 17, the polarizing element was provided with measures against the crack. Therefore, the PVA crack was highly evaluated in particular.

On the other hand, the cohesive layer having a thickness of 20 μm was used for attaching the protective film and the polarizing element. Therefore, the devices were excellent in display quality. However, they were poor in durability, and particularly in moisture resistance, PVA crack, and foaming and peeling. In Comparative Examples 4 and 5, the TAC film having a low resistance to moisture heat was used as the first to fourth protective films and the retardation film. Therefore, the devices were excellent in display quality. However, they were poor in durability, and particularly in void and moisture resistance. In Comparative Examples 6 and 7, the TAC film having a low moisture resistance and/or a PC film having a low heat resistance was/were used as the first to fourth protective films. Therefore, the devices were poor in durability, and particularly in void and moisture resistance.

As mentioned above, the liquid crystal display devices in Examples were comprehensively superior to those in Comparative Examples in display quality such as a contrast ratio in an oblique direction, durability such as void, moisture resistance, PVA crack, and foaming and peeling. And in the devices according to Examples, the number of the films constituting the liquid crystal display device and the number of the attachment (adhesion/cohesion) steps can be decreased, because the protective film for the polarizing element serves also as the retardation film. Therefore, the devices can be manufactured at low cost and can be made thinner. The above-mentioned reason proves that the configuration as in the liquid crystal display devices according to the Embodiments is highly useful.

Furthermore, the liquid crystal display devices in Reference Examples were comprehensively superior to those in Comparative Examples in durability. However, the devices were poor in display quality because they did not satisfy a relationship of 0 nm≦R1+R3−Rlc≦35 nm.

The invention claimed is:

1. A liquid crystal display device comprising:
   a liquid crystal display cell including liquid crystal between two substrates facing to each other;
   a polarizing element provided on each side of the liquid crystal display cell; and
   at least one film member provided in at least either one area of areas between the liquid crystal display cell and the polarizing element,
   the polarizing element being formed from a film made of polyvinylalcohol resin in which iodine or dichromatic dye is absorbed and oriented,
   the film member being attached to the polarizing element with a cohesive layer and/or an adhesive layer having a thickness of less than 10 μm therebetween, and when attached to another film member, the film member being attached to the another film member with a cohesive layer and/or an adhesive layer having a thickness of less than 10 μm therebetween,
   the film member provided in at least either one area of areas between the liquid crystal display cell and the polarizing element having an absolute value of a photoelastic coefficient of less than $10 \times 10^{-8}$ cm$^2$/N and having a water absorption of less than 2.0%; and
   wherein the liuid crystal display device satisfies a relationship of CR (Φ, 60)/CR (0)≧0.025 at all azimuthal angles of Φ=0 to 360° when a contrast ratio of the liquid crystal display cell in a normal direction of the substrate on the observation side as defined as CR (0), a contrast ratio of the liquid crystal display cell in a direction inclined by 60° from the normal direction in an azimuthal angle Φ direction is defined as CR (Φ, 60).

2. The liquid crystal display device according to claim 1, wherein the film member attached to the polarizing element is a protective film exhibiting birefringence.

3. The liquid crystal display device according to claim 1, wherein only the film member having an absolute value of a photoelastic coefficient of less than $10 \times 10^{-8}$ cm$^2$/N and having a water absorption of less than 2.0% is provided at least in an area between the substrate on the rear side of the liquid crystal display cell and the polarizing element on the rear side.

4. The liquid crystal display device according to claim 1, wherein a first protective film is attached on the liquid crystal display cell side of the polarizing element on the observation side,
a second protective film is attached on the observation side of the polarizing element on the observation side,
a third protective film is attached on the liquid crystal display cell side of the polarizing element on the rear side,
a fourth protective film is attached on the rear side of the polarizing element on the rear side, and
each protective film is attached to the polarizing element with a cohesive layer and/or an adhesive layer having a thickness of less than 10 µm therebetween.

5. The liquid crystal display device according to claim 4, wherein the protective films are made of resins having different moisture permeabilities in a combination of the first and second protective films and/or in a combination of the third and fourth protective films.

6. The liquid crystal display device according to claim 5, wherein the liquid crystal display device satisfies at least one of the following formula (1) and (2).

[Formula 1]

$$\text{Moisture permeability of the first protective film} < \text{Moisture permeability of the second protective film} \quad (1)$$

[Formula 2]

$$\text{Moisture permeability of the third protective film} < \text{Moisture permeability of the fourth protective film} \quad (2)$$

7. The liquid crystal display device according to claim 4, wherein at least either one protective film having a larger corrected retardation in the thickness direction of the first and third protective films has an absolute value of a photoelastic coefficient of less than $10 \times 10^{-8}$ cm$^2$/N.

8. The liquid crystal display device according to any of claim 4, wherein at least either one protective film having a larger corrected retardation in the thickness direction of the first and third protective films has an water absorption of less than 2.0%.

9. The liquid crystal display device according to claim 4, wherein at least one protective film among the first to fourth protective films has a moisture permeability of 100 g/m$^2$·24 hr or less.

10. The liquid crystal display device according to claim 9, wherein at least either one protective film of the first and third protective films has a moisture permeability of 100 g/m$^2$·24 hr or less.

11. The liquid crystal display device according to claim 4, wherein at least one protective film among the first to fourth protective films is made of norbornene resin.

12. The liquid crystal display device according to claim 4, wherein a maximum breadth in the absorption axis direction of the polarizing element adjacent to the protective film is larger than a maximum breadth in the absorption axis direction of a display effective area of the liquid crystal display device.

13. The liquid crystal display device according to claim 4, wherein the liquid crystal display device further comprises a bezel, and
a maximum breadth in the absorption axis direction of the polarizing element adjacent to the protective film is larger than a maximum breadth in the absorption axis direction of an aperture region of the bezel.

14. The liquid crystal display device according to claim 4, wherein a peripheral edge crossing the absorption axis direction of the polarizing element adjacent to the protective film is coated with a sealing agent having hydrophobicity.

15. A liquid crystal display device comprising:
a liquid crystal display cell including liquid crystal between two substrates facing to each other;
a polarizing element provided on each side of the liquid crystal display cell; and
at least one film member provided in at least either one area of areas between the liquid crystal display cell and the polarizing element,
the polarizing element being formed from a film made of polyvinylalcohol resin in which iodine or dichromatic dye is absorbed and oriented,
the film member being attached to the polarizing element with a cohesive layer and/or an adhesive layer having a thickness of less than 10 µm therebetween, and when attached to another film member, the film member being attached to the another film member with a cohesive layer and/or an adhesive layer having a thickness of less than 10 µm therebetween,
the film member provided in at least either one area of areas between the liquid crystal display cell and the polarizing element having an absolute value of a photoelastic coefficient of less than $10 \times 10^{-8}$ cm$^2$/N and having a water absorption of less than 2.0%;
wherein a first protective film is attached on the liquid crystal display cell side of the polarizing element on the observation side,
a second protective film is attached on the observation side of the polarizing element on the observation side,
a third protective film is attached on the liquid crystal display cell side of the polarizing element on the rear side,
a fourth protective film is attached on the rear side of the polarizing element on the rear side, and
each protective film is attached to the polarizing element with a cohesive layer and/or an adhesive layer having a thickness of less than 10 µm therebetween;
wherein the liquid crystal display cell provides black display under conditions where most liquid crystal molecules are substantially vertically aligned to the substrates and an in-plane retardation is substantially 0, and
when a corrected retardation R in the thickness direction is defined according to the following formula (3):

[Formula 3]

$$R = (1.3 - 0.6 \times na) \times Rxz + (0.7 - 0.3 \times na) \times Rxy \quad (3)$$

in the formula, na representing an average refractive index of light at a wavelength of 550 nm, Rxz representing a retardation in the thickness direction of light at a wavelength of 550 nm, and Rxy representing a retardation in the in-plane direction of light at a wavelength of 550 nm,
a corrected retardation R1 in the thickness direction of the first protective film, a corrected retardation R3 in the thickness direction of the third protective film, and a corrected retardation Rlc in the thickness direction of the liquid crystal display cell at black display satisfy a relationship shown by the following formula (4)

[Formula 4]

$$0 \text{ nm} \leq R1+R3-Rlc \leq 35 \text{ nm} \qquad (4).$$

16. The liquid crystal display device according to claim 15, wherein the liquid crystal display device satisfies a relationship of CR (Φ, 60)/CR(0)≧0.025 at all azimuthal angles of Φ=0 to 360° when a contrast ratio of the liquid crystal display cell in a normal direction of the substrate on the observation side is defined as CR (0), a contrast ratio of the liquid crystal display cell in a direction inclined by 60° from the normal direction in an azimuthal angle Φ direction is defined as CR (Φ, 60).

17. A film-attached polarizing element comprising:
a polarizing element and a film member,
the polarizing element being formed from a film made of polyvinylalcohol resin in which iodine or dichromatic dye is absorbed and oriented,
the film member being attached to the polarizing element with a cohesive layer and/or an adhesive layer having a thickness of less than 10 μm therebetween, and when attached to another film member, the film member being attached to the another film member with a cohesive layer and/or an adhesive layer having a thickness of less than 10 μm therebetween,
the film member or at least one of the film member and the another film member when the film member being attached to the another film member having an absolute value of a photoelastic coefficient of less than $10 \times 10^{-8}$ cm²/N and having a water absorption of less than 2.0%, and
wherein the film member attached to a liquid crystal display cell side of the polarizing element has a moisture permeability lower than a moisture permeability of the film member attached to the other side of the polarizing element.

18. The film-attached polarizing element according to claim 17, wherein the film member attached to the polarizing element exhibits birefringence.

19. The film-attached polarizing element according to claim 17, wherein the film member is attached to each side of the polarizing element, the film member attached to one side of the polarizing element and the film member attached to the other side of the polarizing element are made of resins having different moisture permeabilities.

20. The film-attached polarizing element according to claim 19, wherein at least one of the film members attached to the polarizing element has a moisture permeability of 100 g/m²·24 hr or less.

21. The film-attached polarizing element according to claim 17, wherein at least one of the film members attached to the polarizing element has a moisture permeability of 100 g/m²·24 hr or less.

22. The film-attached polarizing element according to claim 20, wherein at least one of the film members attached to the polarizing element is made of norbornene resin.

23. The film-attached polarizing element according to claim 21, wherein at least one of the film members attached to the polarizing element is made of norbornene resin.

24. The film-attached polarizing element according to claim 17, wherein a peripheral edge crossing an absorption axis direction of the polarizing element is coated with a sealing agent having hydrophobicity.

25. A liquid crystal display device comprising the film-attached polarizing element of claim 17.

26. A liquid crystal display device comprising:
a liquid crystal display cell including liquid crystal between two substrates facing to each other;
a polarizing element provided on each side of the liquid crystal display cell; and
at least one film member provided in at least either one area of areas between the liquid crystal display cell and the polarizing element,
the polarizing element being formed from a film made of polyvinylalcohol resin in which iodine or dichromatic dye is absorbed and oriented,
the film member being attached to the polarizing element with a cohesive layer and/or an adhesive layer having a thickness of less than 10 μm therebetween, and when attached to another film member, the film member being attached to the another film member with a cohesive layer and/or an adhesive layer having a thickness of less than 10 μm therebetween,
the film member provided in at least either one area of areas between the liquid crystal display cell and the polarizing element having an absolute value of a photoelastic coefficient of less than $10 \times 10^{-8}$ cm²/N and having a water absorption of less than 2.0%;
wherein a first protective film is attached on the liquid crystal display cell side of the polarizing element on the observation side,
a second protective film is attached on the observation side of the polarizing element on the observation side,
a third protective film is attached on the liquid crystal display cell side of the polarizing element on the rear side,
a fourth protective film is attached on the rear side of the polarizing element on the rear side, and
each protective film is attached to the polarizing element with a cohesive layer and/or an adhesive layer having a thickness of less than 10 μm therebetween;
wherein the protective films are made of resins having different moisture permeabilities in a combination of the first and second protective films and/or in a combination of the third and fourth protective films;
wherein the liquid crystal display device satisfies at least one of the following formula (1) and (2):

[formula 1]

Moisture permeability of the first protective film<Moisture permeability of the second protective film  (1)

[formula 2]

Moisture permeability of the third protective film<Moisture permeability of the fourth protective film  (2).

27. A liquid crystal display device comprising:
a liquid crystal display cell including liquid crystal between two substrates facing to each other;
a polarizing element provided on each side of the liquid crystal display cell; and
at least one film member provided in at least either one area of areas between the liquid crystal display cell and the polarizing element,
the polarizing element being formed from a film made of polyvinylalcohol resin in which iodine or dichromatic dye is absorbed and oriented,
the film member being attached to the polarizing element with a cohesive layer and/or an adhesive layer having a thickness of less than 10 μm therebetween, and when attached to another film member, the film member being attached to the another film member with a cohesive layer and/or an adhesive layer having a thickness of less than 10 μm therebetween, the film member provided in at least either one area of areas between the liquid crystal display cell and the polarizing element having an absolute value of a photoelastic coefficient of less than $10 \times 10^{-8}$ cm$^2$/N and having a water absorption of less than 2.0%;

wherein a first protective film is attached on the liquid crystal display cell side of the polarizing element on the observation side, a second protective film is attached on the observation side of the polarizing element on the observation side, a third protective film is attached on the liquid crystal display cell side of the polarizing element on the rear side, a fourth protective film is attached on the rear side of the polarizing element on the rear side, and each protective film is attached to the polarizing element with a cohesive layer and/or an adhesive layer having a thickness of less than 10 μm therebetween;

wherein a peripheral edge crossing the absorption axis direction of the polarizing element adjacent to the protective film is coated with a sealing agent having hydrophobicity.

28. A film-attached polarizing element comprising:

a polarizing element and a film member, the polarizing element being formed from a film made of polyvinylalcohol resin in which iodine or dichromatic dye is absorbed and oriented, the film member being attached to the polarizing element with a cohesive layer and/or an adhesive layer having a thickness of less than 10 μm therebetween, and when attached to another film member, the film member being attached to the another film member with a cohesive layer and/or an adhesive layer having a thickness of less than 10 μm therebetween, the film member or at least one of the film member and the another film member when the film member being attached to the another film member having an absolute value of a photoelastic coefficient of less than $10 \times 10^{-8}$ cm$^2$/N and having a water absorption of less than 2.0%, and wherein a peripheral edge crossing an absorption axis direction of the polarizing element is coated with a sealing agent having hydrophobicity.

* * * * *